United States Patent [19]

Azcua et al.

[11] 4,310,885
[45] Jan. 12, 1982

[54] POINT OF SALE TERMINAL HAVING PROMPTING DISPLAY AND AUTOMATIC MONEY HANDLING

[75] Inventors: Noris S. Azcua, Huntington Beach; George D. Margolin, Newport Beach; Audrey Miller, Claremont; Victor V. Vurpillat, Laguna Niguel, all of Calif.

[73] Assignee: Auto-Register, Inc., Costa Mesa, Calif.

[21] Appl. No.: 957,914

[22] Filed: Nov. 6, 1978

[51] Int. Cl.³ .............................................. G06F 15/21
[52] U.S. Cl. .................................... 364/405; 364/900
[58] Field of Search ........ 364/404, 405, 900 MS File; 194/4 R-4 G

[56] References Cited

U.S. PATENT DOCUMENTS

| | | | |
|---|---|---|---|
| 3,313,923 | 4/1967 | Felcheck | 364/404 X |
| 3,608,690 | 9/1971 | Morrow et al. | 194/4 C |
| 3,631,403 | 12/1971 | Asbo et al. | 364/200 |
| 4,023,011 | 5/1977 | Nakajima et al. | 194/4 R X |
| 4,034,838 | 7/1977 | Uchida | 194/4 R |
| 4,070,564 | 1/1978 | Tucker | 364/405 |

*Primary Examiner*—Jerry Smith
*Attorney, Agent, or Firm*—David S. Woronoff

[57] ABSTRACT

A point of sale system includes at least one computer, a keyboard, and money receiving, dispensing and storing mechanisms. The keyboard has item keys corresponding to an item for sale, category keys, function keys and a numerical pad.

A bill tendered as payment is detected when it enters an opening and, is drawn into a money belt device and to a viewing window. The bill can be accepted or rejected by an operator visually examining the tendered bill. A signal produced by acceptance of the tendered bill is received by the computer to produce change-due data. Each money belt device detects each bill dispensed as change and causes a feedback signal to be produced to dispense another bill as change or to discontinue payment. The money handling mechanisms are placed in a disarmed mode, under control of a computer, at the completion of each sales transaction, and in an armed mode, under control of a computer operated through the keyboard. Another group of keys on the keyboard can produce employee-related data for providing audit information.

41 Claims, 27 Drawing Figures

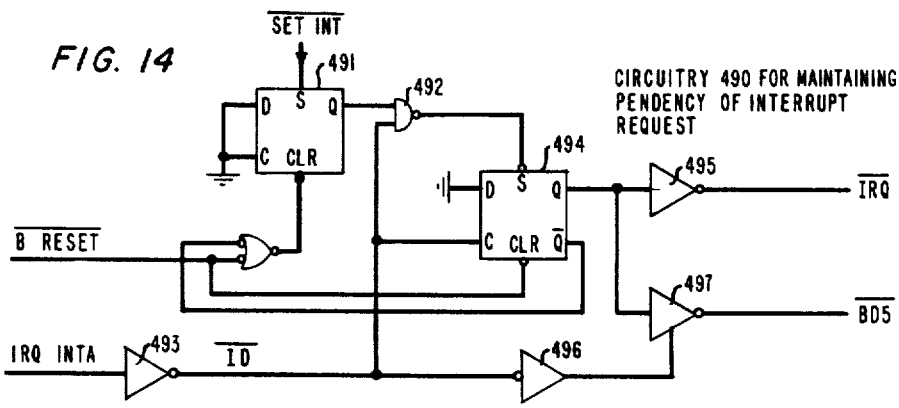
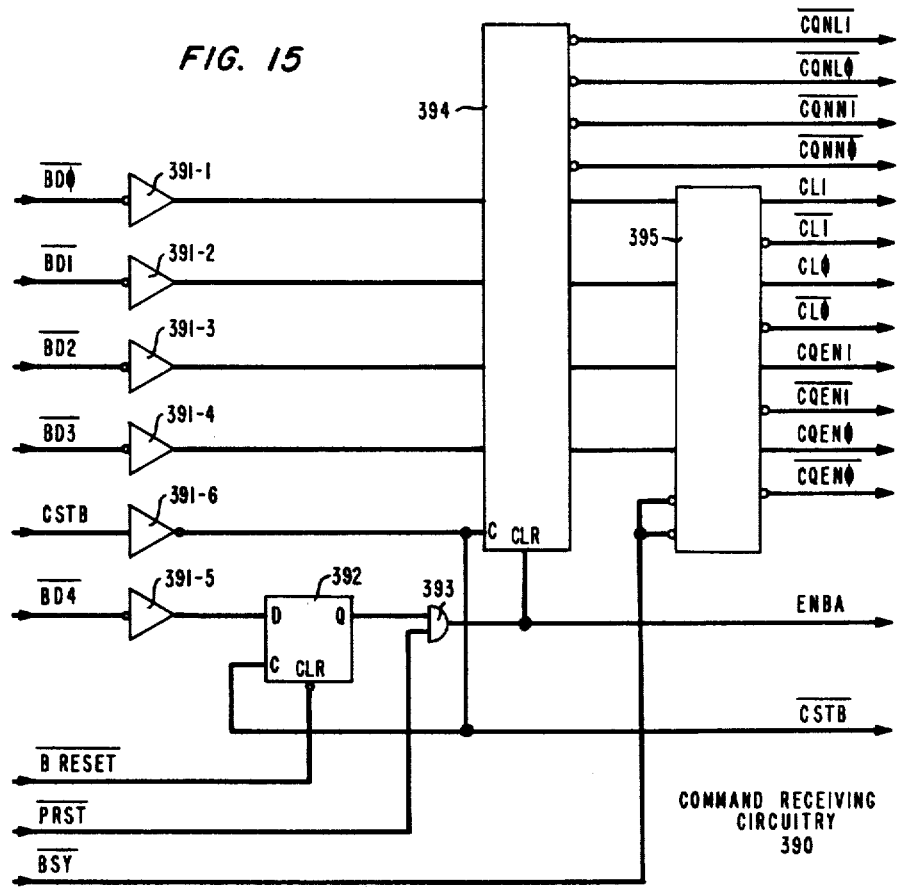

POINT OF SALE TERMINAL HAVING PROMPTING DISPLAY AND AUTOMATIC MONEY HANDLING

CROSS REFERENCES TO RELATED APPLICATIONS

The present invention is related to two other applications filed on the same date as the present application; all of which are assigned to a common assignee. These applications are Automatic Money Handling Device Ser. No. 957,913, filed on Nov. 6, 1978, invented by George D. Margolin and Victor V. Vurpillat and Point of Sale Terminal Having Prompting Display Ser. No. 957,912, filed on Nov. 6, 1978, invented by Noris S. Azcua, George D. Margolin, Audrey Miller and Victor V. Vurpillat. Those two application are incorporated by reference into the present application as fully as if they were reproduced herein.

BACKGROUND

This invention relates to a point of sale system for receiving information relating to sales transactions and for accepting money and dispensing change for each sales transaction without requiring an operator to touch any money.

In the past, there have been provided pilfer-proof automatic cash registers into which either an attendant or a customer deposits money paid for a sales transaction and from which money is dispensed as change. Such cash registers are arranged to eliminate the need for a cash drawer, and are automatically controlled to accept money into a cache and dispense change due from the cache.

Previous automatic cash registers have a number of disadvantages. Some lack the capability of quickly and easily calculating the amount due, receiving bills of different denominations in payment of the amount due, paying out bills of different denominations as change, and providing useful audit information. Some cash registers do not provide fail-safe features for isolating one sales transaction from another or for preventing tampering with the system. Other cash registers contain complex and expensive subsystems having optical means for verifying the genuineness of bills paid by the customer. Many automatic cash registers have controls which are complicated or cumbersome for the customer to use and therefore are not suitable for use in high volume sales transactions. Many business establishments sell a number of high volume items as well as a number of low volume items. Previous keyboard operated automatic cash registers lack simplified keyboard controls with which the operator can actuate keys for quickly and easily calculating the amount of a sales transaction involving both high volume and low volume items.

The present invention provides an automatic cash register which overcomes all of the disadvantages described above.

SUMMARY OF THE INVENTION

According to one aspect of the invention, a point of sale terminal has one or more computers which have input/output devices. In a preferred embodiment, the inventive device has at least one programmable microprocessor, a read-only memory storing programs, constants, and the like, and a random access memory. In a preferred embodiment, a keyboard has item keys which an attendant can actuate to cause item-identification data to be entered into the computer. Preferably a plurality of total keys are provided so that each attendant working on a shift can be allocated a personal total key. Actuation of any total key marks the end of a sequence of entries of item-identification data and arms a money handling device.

Electro-mechanical money handling apparatus is provided including a plurality of electrically controlled and powered devices for receiving, dispensing and storing bills and coins. The bill handling device has an opening through which the bills enter and exit, a drive mechanism and sensing devices adjacent the opening. A controller device is coupled to the keyboard and to the drive mechanism. The computer has information retrieval capability and arithmetic capability. The controller device controls the receipt and dispensing of bills and coins as change and is itself controlled by the computer.

According to another aspect of the invention, the bill handling mechanism has a window for displaying a bill for visually testing its genuineness and denomination. A key actuated by the operator causes a bill to be dispensed to enable the rejection of any tendered bill failing such testing.

According to a further aspect of the invention, a point of sale terminal has a plurality of money belt devices. Each money belt device has an associated viewing window and accept and reject keys on the keyboard. One embodiment of the invention has four money belt devices; one for $1 bills, one for $5 bills, one for $10 and $20 bills and checks and one for special coupons such as gift certificates, promotional certificates and the like. Each money belt device can accept or reject bills under the control of a computing device and the keyboard actuated by an operator. Only the $1 and $5 money belts can dispense bills as change. Each belt has associated with it two or three sensors for detecting the presence and location of a bill. The control device operates so that only one money belt device at a time can accept or dispense bills. A signalling device is located near each money belt device to indicate which money belt has a bill tendered to it.

Another important aspect of the present invention relates to the utilization of a prompting device with the point-of sale terminal. The prompting device has an embodiment which has graphic material displayed through a viewing window located on the keyboard. The display mechanism includes electro-mechanical rolls. Cathode ray tube and film displays may also be used. The prompting display shows items for sale arranged by category with all necessary coding information to enable an operator to actuate the keyboard and complete the sale of a particular item. A number of category keys are placed on the keyboard adjacent the keyboard which correspond to the categories shown by the display.

Another aspect of the invention relates to the keyboard for use with the point-of-sale terminal which has item keys, category keys, function keys and a numeric pad. The function keys include accept and reject keys placed near the money belt viewing windows. With this combination of keys all items for sale at the terminal can be shown by the prompting display and the most frequently ordered items can be shown pictorially by the item keys. These functions can be accomplished for several hundred items with a keyboard having less than 20 item and category keys and without the need to teach the operators a complex routine.

BRIEF DESCRIPTION OF THE DRAWINGS

FIGS. 12-23 show details of the electrical circuitry shown in the blocks in FIG. 11 used in one embodiment of the present invention.

DETAILED DESCRIPTION

Introduction

The present invention provides a point of sale terminal for automatically calculating a payment due for a sales transaction and for receiving money tendered in payment and for dispensing change. The system includes a data processing subsystem comprising at least one computer, a memory which may include a read-only memory (ROM) and a random-access memory (RAM); a keyboard; and a customer-fed money storage and pay-out device. The keyboard includes a group of item-representing keys, preferably for those items having the highest volume of sales. The terminal also includes a prompting display for prompting the operator to key in item-identification data. A computer receives such item-identification data, retrieves from the memory price data for each keyed item, and calculates the total price of the transaction. The money handling device has a plurality of customer-fed bill belts for receiving, storing and dispensing bills of different denominations, as well as for receiving checks, coupons, and the like. The money handling device includes a coin receiver, storer, sorter and dispenser. The bill and coin devices operate under control of one or more computers to receive money and to dispense change. A digital display subsystem operating under control of a computer displays the amount of sale and the amount tendered. A printer provides a printout of sales data and data identifying the attendant responsible for each transaction.

Figure 1:
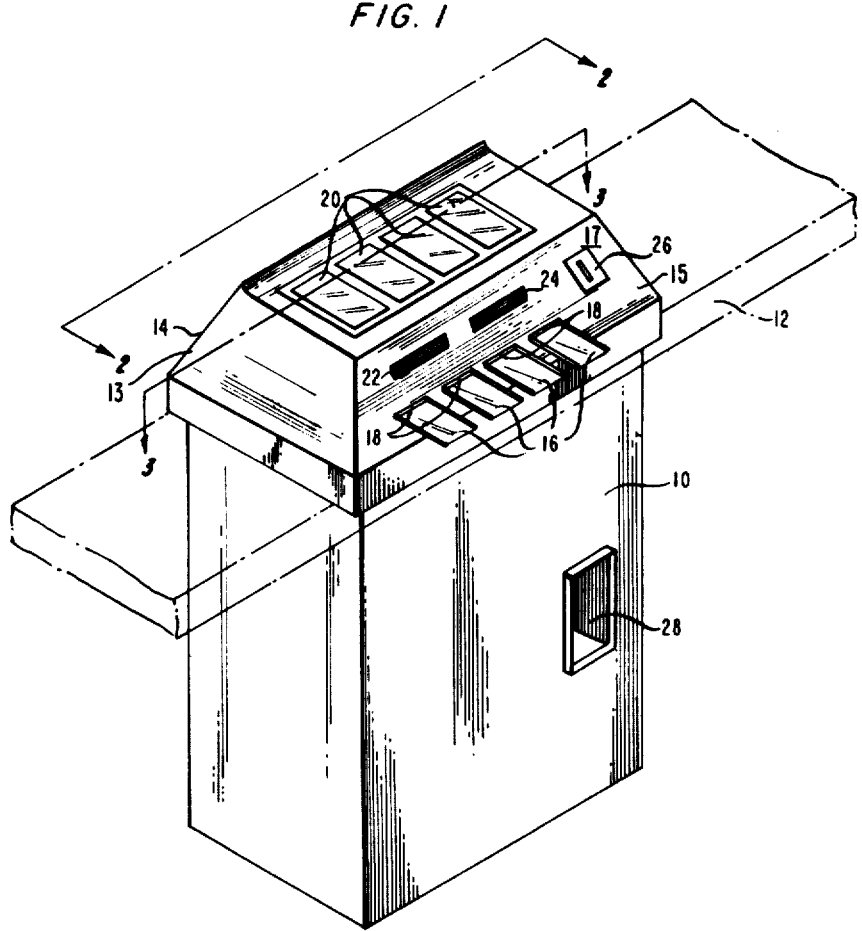
FIG. 1 is a perspective view of one embodiment of the present invention.
Figure 2:
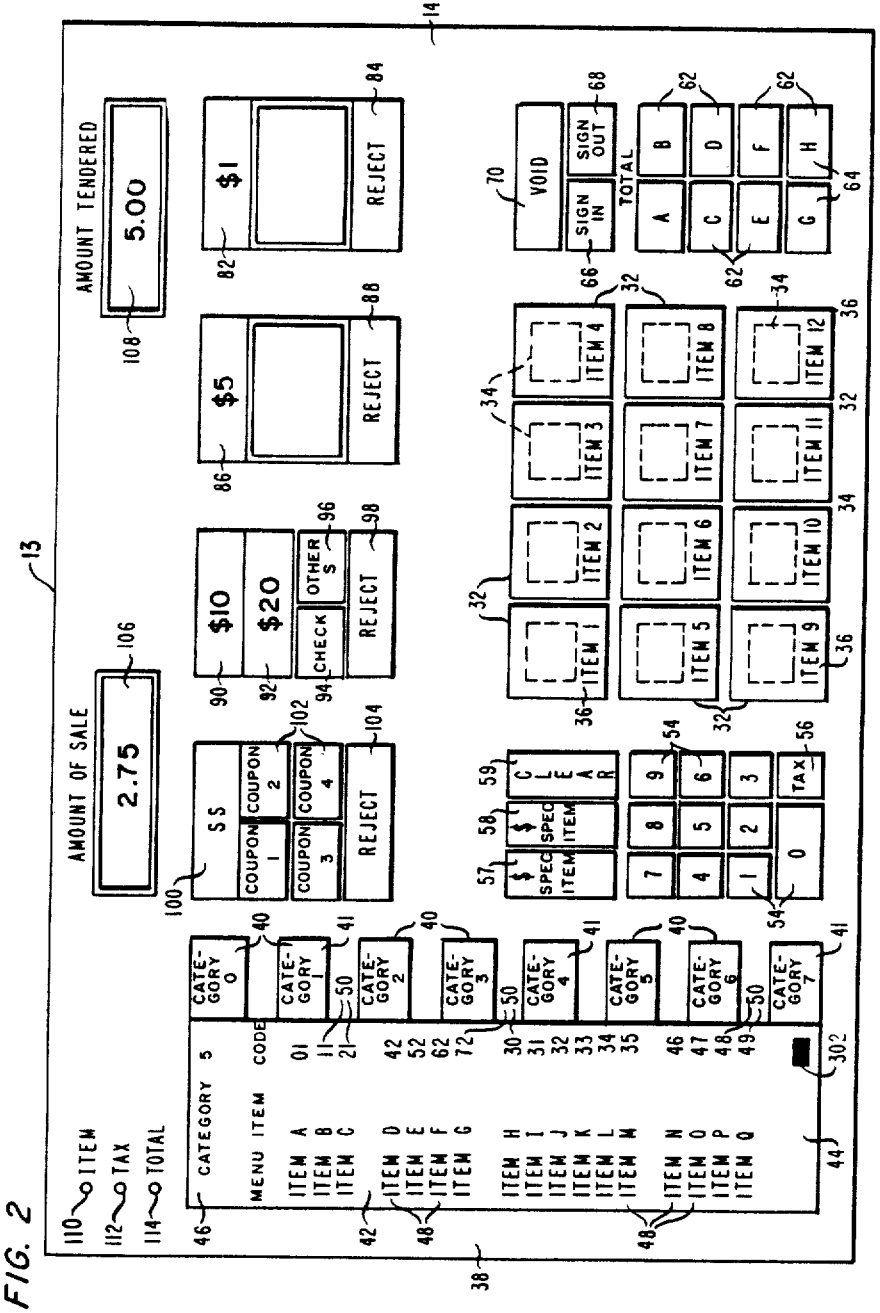
FIGS. 2 and 3 show elevations of the embodiment shown in FIG. 1 taken along the lines 2—2 and 3—3 respectively.
Figure 3:
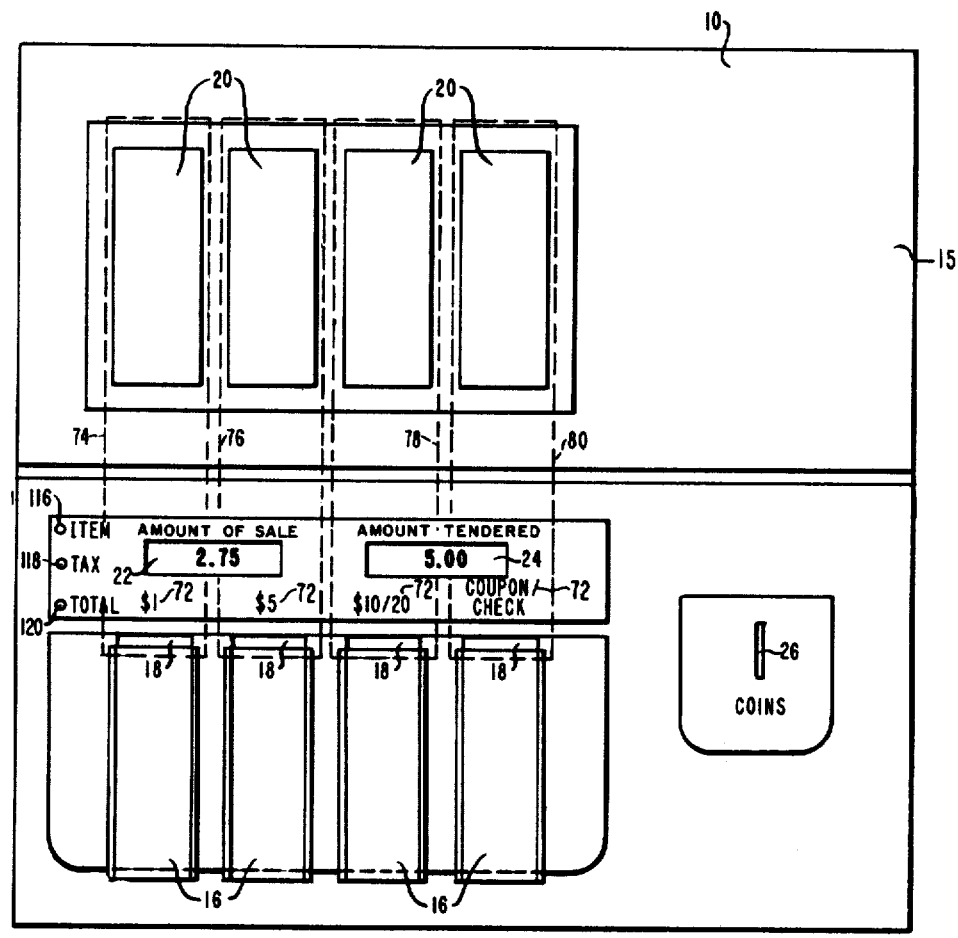

FIGS. 1 and 3 illustrate housing 10 having an interior for containing electro-mechanical and electronic apparatus. An upper portion of the housing has an exterior face 11 with a keyboard 14 on one side 13 of the housing. The keyboard shown in FIG. 2 is described in detail in a separate section.

The upper portion on a customer side 15 of the housing has an exterior face 17 for access to a series of four side-by-side customer-fed bill belt devices. Each bill belt device is a separate electro-mechanical device subject to common control. In a separate section there is a detailed description of an individual bill belt. Each bill belt communicates with a corresponding one of four money trays 16 projecting outwardly from the customer side 15 of the housing 10. Each bill belt device has an inlet/outlet channel at the junction between the tray and the housing. Bills dispensed as change or rejected are received in the money trays 16.

Four side-by-side windows 20 are provided on a top portion of the housing for viewing from both the attendant side 13 and the customer side 15 of the housing. Each bill belt is aligned with one of the windows 20 so that a bill sandwiched between the bill belts can be viewed by an operator.

The customer side 15 of the housing 10 includes digital displays 22 and 24. Display 22 shows the total amount of each sales transaction and display 24 shows the amount tendered by the customer. A coin slot 26 and a coin receptable 28 are located on the customer side 15 of the housing 10.

There are on the keyboard: a group of Total keys by which each operator can enter data that the computer recognizes as both transaction data and employee-identification data; and a group of Accept and Reject keys by which an operator can control the bill belts.

Figure 5:
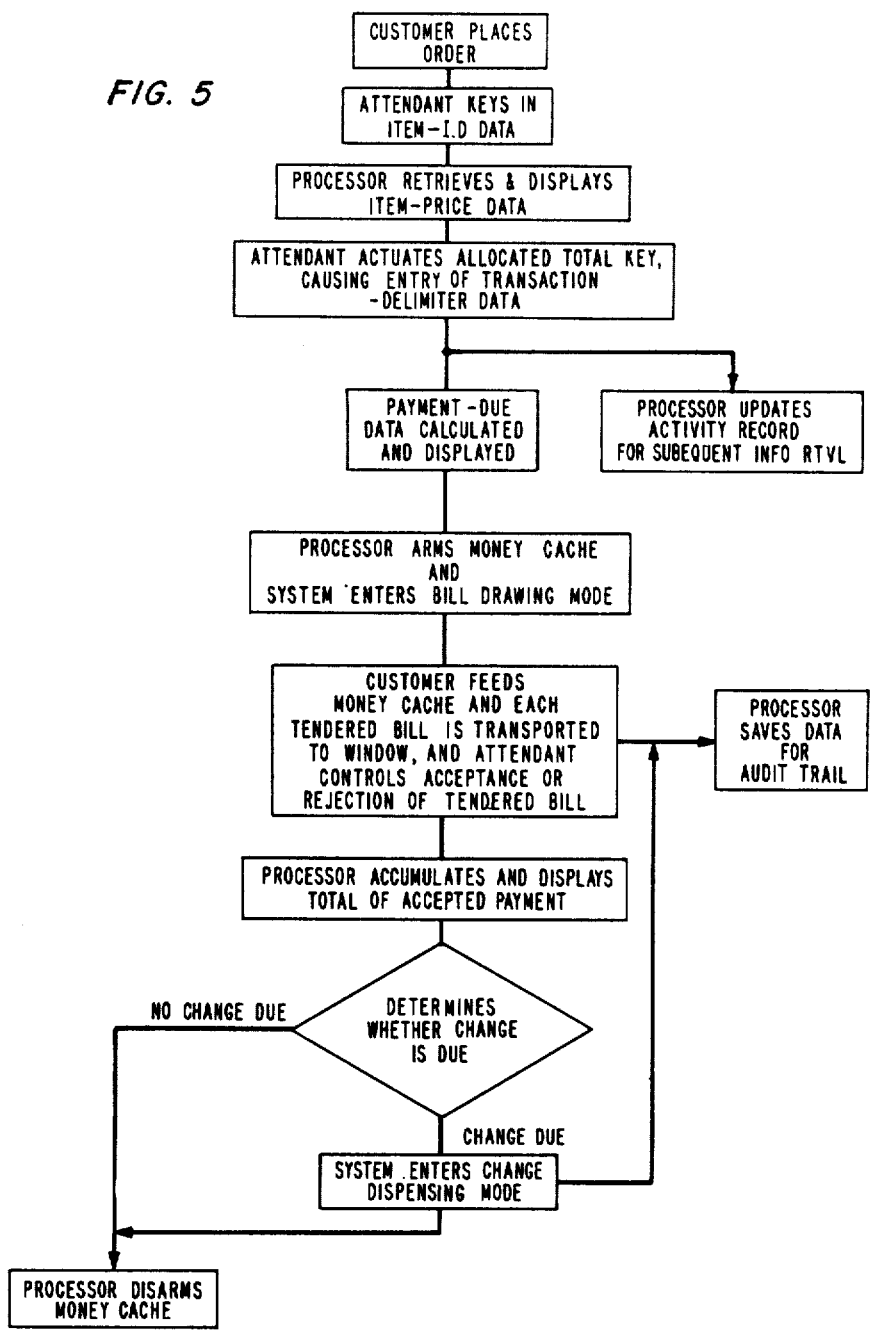
FIG. 5 is a block diagram showing the basic organization of one embodiment of the present invention.

A feature of the present invention is that the attendant need not remember the price of any item ordered by a customer. FIG. 5 shows in block diagram form the steps taken during the use of the present invention which steps are themselves believed to be novel and which are described in detail in the following paragraphs. Having received the customer's order, the attendant simply actuates the appropriate keys, either item keys or category and number keys as prompted by the prompting display to key in item-identification data. In response, the data processor retrieves from memory the corresponding price data, and displays it on 22. After all the ordered items have been entered, the operator actuates the proper Total key to conclude the other phase of the sales transaction. The next phase of the sales transaction involves the calculation and display of payment-due data. In as much as the data entered by the Total key provides employee-identification the computer can update an activity record stored in the memory. Such an activity record is particularly useful to evaluate performance of employees.

After the payment-due has been calculated, the computer arms the money belts either directly or through another computer or controller. An attemped deposit of money by a customer prior to such arming will prove fruitless. Prior to arming, any coin deposited in the coin slot 26 drops down a chute to coin receptacle 28 for return to the customer. Deposit of a bill into the unarmed bill belts will leave the bill in the tray 16. This feature minimizes the possibility of disputes, since it is a simple matter to demonstrate that money cannot be fed into the unarmed money receptacles.

Once armed the terminal enters a pay-in mode. Now, when the customer drops a coin into coin slot 26 it will be sorted and stored on the basis of denomonation. Each bill tendered is transported to the window 20 for viewing. If the customer tenders an unacceptable bill, the attendant can cause it to be returned to the customer by actuating the appropriate reject key 84, 88, 98, 104. If the visual test is passed, the attendant actuates an Accept key. The computer is responsive to successive actuations of the Accept keys after a bill is sensed to accumulate and display a running total of the amount of money accepted. The computer determines whether any change is due to the customer. If no change is due to the customer, the data processor disarms the money handling apparatus. If change is due, the system enters a change-dispensing mode during which either or both coins and bills are dispensed. In either case a printer produces a record of the transaction.

Figure 25:
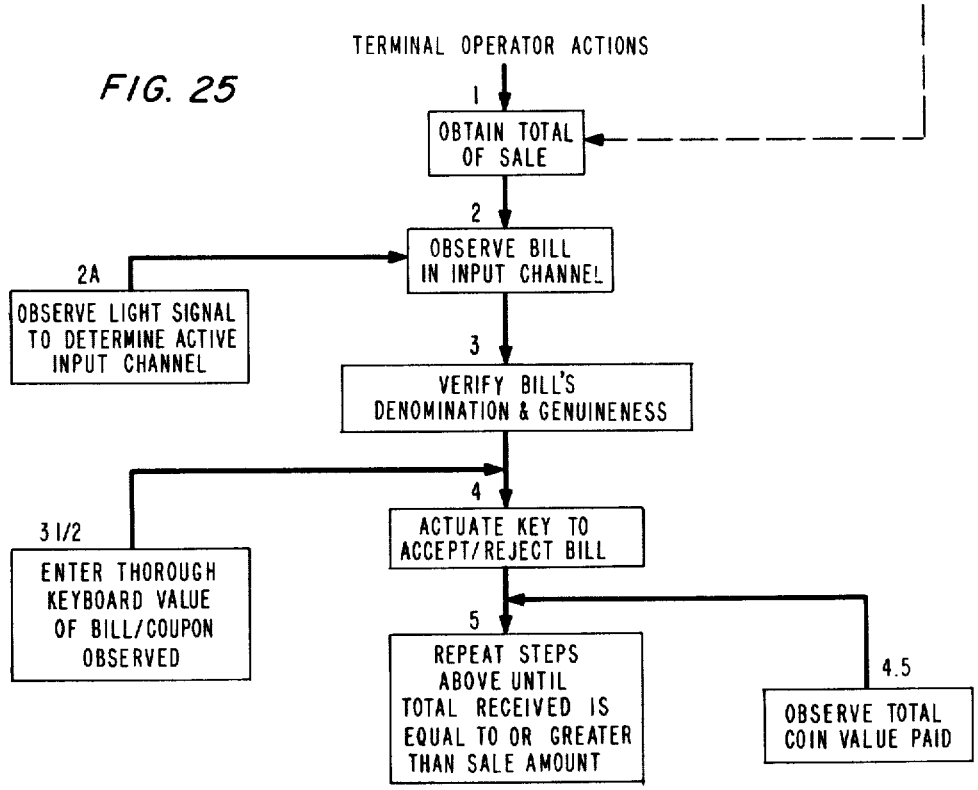
FIG. 25 shows a block diagram showing the novel steps used in connection with the inventive method of using the automatic money handling device forming part of the present invention.

FIG. 25 shows in block diagram form the inventive method of use of one embodiment of the present terminal. Block 1 shows that the operator obtains from the terminal the total of a sale. The customer then inserts a bill into an input channel which causes a light signal to indicate which bill channel is in use. The money handler brings the bill to a viewing window. The operator observes the signal light and then looks to the proper viewing window to observe the bill that had been put into the device. After observation, the operator, as shown in block 4, actuates either an accept or a reject key. The above steps are repeated until the total cash received is equal to or greater than the amount of the sale. Blocks 3½ and 4.5 show the steps used by the operator if either a special bill or coupon is used or if coins are put into the device.

Keyboard

The keyboard illustrated in FIG. 2 includes a group of individual item-representing keys 32, or Best Seller keys. In the illustrated embodiment there are twelve Best Seller keys 32 in the group. Each Best Seller key preferably has a corresponding pictorial representation, (illustrated in phantom lines at 34 on each key) of the item associated with that particular key, together with a separate label 36 printed on each key describing the item associated with that particular key. The labels 36 relating to the items identified by the twelve Best Seller keys are indicated in the drawings as Item 1 through Item 12 for simplicity.

The keyboard 14 also includes a prompting display 38 for displaying product category and corresponding item-listing information for the less frequently sold items and for the Best Seller items the prompting display provides data for prompting the attendant to actuate certain keys on the keyboard to identify to the data processor corresponding less-frequently sold items being sold at the point of sale.

In the illustrated embodiment, a series of eight mutually spaces apart Category keys 40 are positioned alongside a window 42 which covers the prompting display and through which the prompting display can be viewed. Each category key has a corresponding label 41 for identifying a category of information to which the key corresponds. The prompting display includes a movable roll 44. An electro-mechanical drive apparatus is provided for moving the roll 44. Each category and its related list of items is printed on the roll. A selected portion of the roll can be moved to the window 42 for display when the attendant actuates a particular Category key 40. For example, in the embodiment shown a category heading 46 entitled "CATEGORY 5" displays a listing of corresponding individual items 48, depicted as "ITEM A" through "ITEM Q". When the attendant manually actuates the category key 40 labeled "CATEGORY 5" the roll 44 is moved until the listing for CATEGORY 5 is displayed in the window 42.

The roll shows a separate item-identifying code 50 unique to each item listed in the prompting display. In the illustrated embodiment the prompting indicia for each item is a two-digit number displayed on the roll next to the item.

A group of numeric keys 54, hereafter collectively called a numeric pad, are positioned on the keyboard next to the prompting display 38. The numeric pad preferably comprises ten individual keys labeled 0 through 9, respectively, with an eleventh key 56 labeled "TAX", for identifying taxable items. The numeric pad can be used to identify to the data processor items selected from the prompting display. To identify each item selected from the prompting display, first a category key is actuated and then two of the numeric keys are actuated in an order which supplies to the data processor a three-digit number for identifying the selected item. For example, to indicate ITEM J in CATEGORY 5 first the CATEGORY 5 key is actuated and then the numeric keys are actuated in the sequence 3,2 for supplying a corresponding three-digit number (5,3,2) to the data processor for identifying ITEM J.

The prompting display roll preferably contains a listing of all available items for sale. Owing to this preferred feature, "redundancy" is provided in that items represented on the Best Seller keys 32 are also represented on the roll.

By way of example, in the course of the order-entry phase of a sales transaction involving the sale of one or more best seller items and one or more less frequently sold items, separate item-representing keys 32 are actuated to indicate purchase of each best seller item. The prompting display is actuated to display information relating to each item not represented on the Best Seller keys, and in a sequence prompted by the prompting display, the numeric keys 54 are actuated to indicate a separate multi-digit code for each less frequently sold item displayed on the prompting display. Data processor subsystem includes a look-up table for retrieving a pre-loaded price for each item identified in the order-entry phase of the sales transaction. The Tax button 56 is actuated after each taxable item is indicated and the data processing subsystem calculates the tax on each taxable item. An arithmetic unit in the data processor sums the individual prices of each identified item, as well as the tax on each item, so as to calculate the total price of the sale transaction.

The keyboard includes Total keys 62. In the illustrated embodiment, there are eight Total keys having indicia 64 suitably the letters A through H. In response to the actuation of any one of the Total keys during a sales transaction, the computer calculates the payment due.

Above the group of numeric keys there is a first Special-Item key 57. This key is used to enter into the data processor information concerning the sale of special items not otherwise identifiable by the item-representing keys 32 or the category information in the prompting display 38. The data processor can be programmed so that when the Special-Item key 57 is actuated, followed by entry of the sale amount, in cents, on the numeric keys 54, the sale can be recorded, along with its identification as a special item by selection of the next keyboard entry. If this is the last or only sale entry, then actuation of a corresponding Total key 62 can record the sale.

A second Special-Item key 58 above the group numeric keys can be used to enter the sale of gift coupons. The data processor can be programmed so that when the second Special-Item key is actuated, followed by entry of the sale amount on the numeric keys, 54, the sale is recorded and identified in a manner similar to the first Special-Item key described above.

A Clear key 59 is located above the group of numeric keys 54. The Clear key is used for clearing the last entry made.

A Sign-In key 66 and a Sign-Out key 68 are located on the keyboard above the Total keys 62. The Sign-In key is manually actuated by each attendant to indicate when he or she is starting a work shift and to assign a separate attendant identification code to each attendant. An attendant starting a work shift can depress the Sign-In key, enter his or her three digit attendant number on the numeric pad 54, and depress his or her assigned Total key 62 for indicating his or her code for that particular work shift. Once a particular Total key is assigned to an attendant by the sign-in procedure, that particular Total key is unavailable for being assigned to another attendant until the Sign-Out key is actuated to release use of the key for an attendant working a subsequent work shift.

The Sign-Out key 68 is manually actuated to cause the data processor to record the times when the attendants end their respective work shifts, as well as for releasing the Total key code assigned to each attendant ending a work shift. Attendants ending their work shift sign out by actuating the Sign-Out key, entering their employee number on the numeric key 54, and entering their assigned code on one of the Total keys 62.

A Void key 70 is provided on the keyboard above the Sign-In and Sign-Out keys. The Void key is used to clear from the data processor all data entered from the start of a given sales transaction. The Void key becomes inoperative after arming of the bill caches.

Above each bill belt opening is a label 72 indicating the type of paper currency or money equivalent to be inserted into the opening of each bill belt: 10. One dollar bills for a first bill belt 74; five dollar bills for a second bill belt 76; either $10 or $20, checks or other bills for a third bill belt 78; and other bills, checks, coupons, etc., for a fourth bill belt 80. The fourth bill belt is adapted for receipt of promotional items.

Each group of Accept/Reject keys as shown in FIG. 2 includes one or more keys labeled according to the type of bill, coupon, check, etc., to be received by a corresponding bill belt. A first group of Accept/Reject keys associated with the first bill cache 74 includes a One Dollar Accept key 82 and a One Dollar Reject key 84.

The second group of Accept/Reject keys comprises a Five Dollar Accept key 86 and Reject key 88.

A third group of Accept/Reject keys includes a Ten Dollar Accept key 90, a Twenty Dollar Accept key 92, a Check Accept key 94, an Other Dollar Accept key 96, and a reject key 98 for rejecting any of the bills in the third bill belt.

Above a fourth group of Accept/Reject keys, there is a special function key 100 labeled "SS" for entering acceptance of special transactions not covered elsewhere on the keyboard. The fourth group comprises a set of four keys 102 for indicating acceptance of four different types of coupons or similar store promotion certificates. A Reject key 104 enters rejection of any coupon certificate or the like tendered into the fourth bill cache.

Operation of the Accept/Reject keys is understood best by the following example. After having entered data relating to all items involved in a single order, the attendant depresses his or her assigned Total key 62 to calculate and display the amount of sale, i.e., the payment due. Payment is made by the customer by inserting coins into the coin slot 26 and/or bills, checks, coupons or the like into appropriate openings 18. Upon tendering of a bill to any opening 18 a light identifying the active bill belt cues the attendant to look to the proper window 20. The attendant then visually inspects the tendered bill. Upon verification, the attendant depresses the appropriate One, Five, Ten, Twenty key. Actuation of any of these keys indicates the amount of payment made against the total sale amount.

When payment of an amount equal to or greater than the amount of sale is detected by the data processor, the required amount of change, if any is automatically calculated and dispensed by the coin, the one dollar and five dollar bill devices as required. No change is given from other than the one or five dollar bill belts and the coin changer. Recording of receipts and disbursements by denomination, along with the store-opening amounts, enable the system to maintain an accurate account of all bills and coins throughout the business day.

Customer submittal of checks or other bill denominations (two dollars, fifty dollars, etc.) is verified by the attendant examining the dollar or check amount through the corresponding window 20. If the tendered bill or check is acceptable, the attendant then enters the amount of the bill or check, using the numeric keys 54. Subsequent actuation of either the Check key or the Other dollar key 96 identifies the type and amount of payment to the data processor.

Actuation of the "SS" keys 100 provides a means to record and identify special transactions, such as discounts, give-aways, no charge sales, etc. Under these conditions the bill belts are not activated. Actuation of the SS key, preceded by entering the amount on the keys 54 enters an amount to be deducted from the total sale and recorded as expense.

The coupon keys 102 labeled Coupon 1 through Coupon 4 can be used to identify different types of promotional sales. Actuation of these keys can cause the data processor to accept the value previously entered on the numeric keys 54, to identify the sale as resulting from a store promotion and to enter in memory the cash value of the promotion to be used later on cash reconciliation.

The keyboard includes a first digital display 106 for displaying the amount of sale of each sales transaction, and a second digital display 108 for displaying the cumulative amount tendered in payment of each sales transaction. Display 106 can be used to momentarily display the price of each item sold and the tax on each item sold. The keyboard also includes a first LED 110 for being activated when display 106 relates to the price of a particular item being sold; a second LED 112 for indicating the tax on either the amount previously displayed or the total tax; and a third LED 114 to be activated when display 106 indicates the total amount of the sales transaction, including tax.

On the customer side 15 of the housing 10, as illustrated in FIG. 3, the digital displays 22 and 24 provide the same displays as the amount of Sale display 106 and the Amount Tendered display 108, respectively. Similarly, LED displays 116, 118 and 120 on the customer side 15 of the housing are activated along with corresponding activation of the LED's 110, 112, and 114 for corresponding item, tax and total information, respectively.

In a specific embodiment, in which the keyboard 14 is adapted for use in a point of sale terminal involving the sale of ice cream products, all keys on the keyboard are a flattouch type which can be wiped clean with a damp cloth and which have no openings through which liquids can reach the switching mechanisms. Switches are mechanical, rather than capacitive, in order to minimize accidental activation.

Bill Handling

Figure 4:
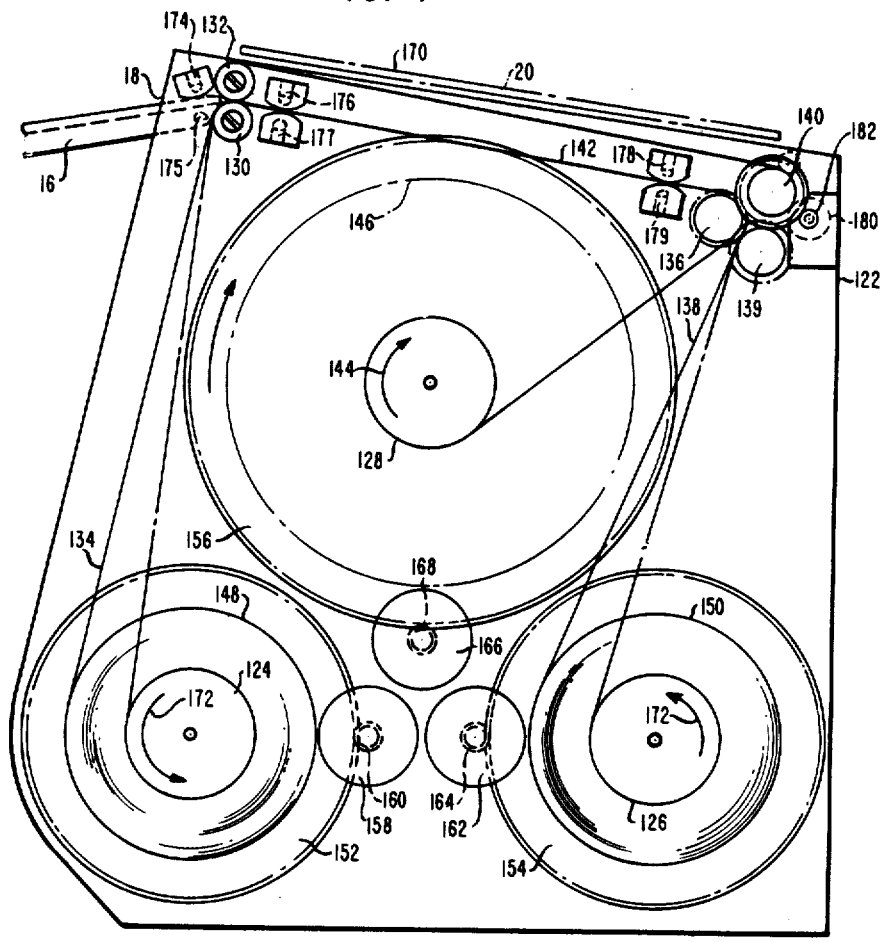
FIG. 4 is a sectional view showing a money handling mechanism forming a part of the present invention.

The construction of each bill belt device is shown in FIG. 4. Each bill belt device includes a housing 122 containing a first and second supply unstoring reels 124, 126 spaced apart from each other, and a take-up or storage reel 128. A lower entrance roller 130 is located immediately inside the housing 122 below the opening 18 and an upper entrance roller 132 is located immediately inside the housing 122 above the opening 18 and above the lower entrance roller 132. The two entrance rollers are rotatable about corresponding axes of rotation which are parallel to one another and perpendicular to the path of travel of a bill inserted into the opening of the bill cache.

A first transparent money belt 134 is secured at one end to the first supply reel 124 and is secured at its opposite end to the storage reel 128. The first belt has a portion extending upwardly away from the first supply reel, around the lower entrance roller, and then along a straight path away from the entrance rollers and around a first guide roller 136 on a side of the housing opposite the entrance roller. Such portion of the first belt then extends from the first guide roller down to the storage reel 128. A second transparent money belt 138 has a portion extending upwardly from the second supply reel 126 into engagement with a second guide roller 139 adjacent the first guide roller 136 and then around a third guide roller 140 above the second guide roller. Such portion of the second belt then extends along a straight path near the top of the housing toward the entrance to the bill cache and is wrapped around the upper entrance roller 132 and is then reversed to travel in a superposed relation above the portion of the first web which extends in a straight path across the top of the housing. The superposed path of the first and second belts is illustrated at 142 in FIG. 4 and is referred to below as the viewing path or viewing position. The first and second belts both extend around the first guide roller 136 in their superposed relation and both belts then extend down to the storage reel 128, in the superposed relation, for attachment to the storage reel. The first and second belts are wound in unison around the storage reel when the storage reel is rotated in the direction of the arrow at 144 shown in FIG. 4.

Thus, the first and second belts converge at the entrance rollers which, in turn, apply a slight amount of pressure against one another so that the two belts are pressed slightly into contact with one another as they converge inside the opening 18 to the housing 122. The belts then pass in a superposed relation along the straight viewing path 142 across the upper portion of the housing from the opening 18. The two belts are held in contact with one another along the straight viewing path 142 as they pass around the first guide roller 136 to the storage reel 128.

First and second gear wheels 152, 154 are rigidly affixed to the first and second supply reels 124, 126. The two gear wheels are the same diameter, and have gear teeth of identical size and spacing.

A third gear wheel 156 is rigidly affixed to the storage reel. The third gear wheel has approximately twice the area of either the first or the second gear wheel, and has gear teeth of the same size and spacing as the first and second gear wheels.

A first supply reel drive motor 158 is mounted in the housing 122 adjacent the first gear wheel 152. A first driven gear wheel 160 on the output shaft of the first supply reel drive motor engages the first gear wheel. The first driven gear wheel is substantially smaller in diameter than the diameter of the first gear wheel. Similarly, a second supply reel drive motor 162 is mounted on the housing adjacent the second gear wheel 154, and a second driven gear wheel 164 identical to gear 160 on the output shaft of the second supply reel drive motor engages the second gear wheel.

A take-up reel drive motor 166 is mounted in the housing 122 adjacent the third gear wheel 156, and a third driven gear 168 on the output shaft of the take-up reel drive motor engages the third gear wheel.

A servo mechanism is provided for the bill belts which has a controller.

A computer issues a number of commands to the controller. The computer commands may be in software, firmware or hardware or any combination of them.

When the bill belt is operated in a pay-in mode, its take-up reel drive motor 166 is energized by the servo to rotate the third gear wheel 156 clockwise in the storing direction (with reference to FIG. 4) which, in turn rotates the storage reel 128 in the clockwise direction illustrated by the arrow 144 in FIG. 4. At the same time, the first and second belts unwind from their respective supply reels and travel together, in their superposed relation, along the viewing path 142 away from the entrance rollers and toward the first guide roller 136. Preferably, tension is maintained by applying a relatively low level of energization to the supply reel drive motors 158 and 162 which are electrically connected in series. The bill is drawn into the opening 18 and between the first and second belts by the action of the belts traveling over the entrance rollers and into the housing along the viewing path 142 to a window 20 in the point of sale housing 10. The window 20 is illustrated in phantom in FIG. 4. The drive motors are de-energized, under control of a computer, to position the bill below the window, for viewing by the operator.

As bills continue to be drawn into the housing they become sandwiched between the belts wrapped around the storage reel 128.

When the bill belt is operated in a pay-out mode, its series-connected supply reel drive motors are energized by the servo to turn their respective gear wheels in a counterclockwise direction in a unstoring direction (with reference to FIG. 4) which, in turn, rotates the supply reels in a counterclockwise direction, as illustrated by the arrows at 172 in FIG. 4. The unstoring direction is the dispensing direction. In the pay-out mode, bills are dispensed. Preferably, tension is maintained by applying a relatively low level of energization to the take-up reel drive motor 166. This travel of the belts causes each bill sandwiched between them to be payed out through the opening 18.

In the illustrated embodiment, the bill belt sensors include outer optical detectors 174,175 outside the entrance rollers 130, 132 and inner optical detectors 176,177 inside the housing adjacent the entrance rollers. The outer sensors can be a first infra-red (IR) sensor 174 located in front of the entrance rollers above the opening 18 and a cooperating IR emitter 175 embedded in the money tray 16 in front of the entrance rollers and below the first IR sensor 174. The emitters 175 and 177 are electrically connected in a gate-controlled series circuit path.

The outer optical sensors are located as close to the outside of the entrance rollers as possible. It is desirable that the inner optical sensors also be located fairly close to the inside of the entrance rollers, although they can be spaced inwardly from the entrance rollers no more than the length of a bill being tendered into the bill cache.

In a bill belt, each of the two emitter and sensor combinations provides for detecting when a bill is present between them. Each sensor senses all the IR radiation transmitted to it from the corresponding emitter when no bill is present between them, and the sensor produces an output signal having a first value proportional to the sensed transmitted IR radiation for indicating that no bill is present. When a tendered bill is present between the sensor and detector, a certain amount of IR radiation is transmitted through the bill, but most transmitted IR radiation is blocked. The sensor produces an output signal having a second value proportional to the reduced amount of sensed transmitted IR radiation for indicating that a bill is present. This capability of the sensors can be used to detect bills that are too light absortive, e.q. double bills, or bills that are too light transmissive, e.q. certain counterfeit bills.

IR-type emitters and sensors are used so that the bill cache controls are insensitive to stray ambient light, i.e., light in the visible spectrum.

The outer optical sensors 174, 175 are used as part of a device to count bills dispensed as change. During operation in the pay-out mode, each bill dispensed to the opening 18 is detected by the outer optical sensing device. The bill belts can be controlled to dispense each bill entirely past the entrance rollers and past the first sensing device and into the money tray 16; and the outer sensing means can detect when each bill has been dispensed from the opening to provide data to a counter for counting each bill so dispensed.

Alternatively, the bill belts can be controlled in the pay-out mode to feed a bill halfway through the opening so that the bill remains between the entrance rollers blocking the outer sensor until the bill is taken from the opening by the customer. The outer sensor can detect when a bill present between the entrance rollers is taken by a customer and can produce data fed to a counter for counting each bill taken by the customer. The bill belts can be controlled in the pay-out mode to feed only the last bill paid as change halfway through the opening 18. The computer disarms the bill belts after the last bill is payed out as change, and remains so until a subsequent arming command from a Total key.

The inner optical sensors 176, 177 can detect whether or not a bill that is tendered into the opening is actually drawn into the housing. The pay-in cycle is activated when the outer optical sensors 174, 175 indicate that a bill is in the opening. If the tendered bill is not detected by the inner optical sensors 176, 177 within the 0.5 second time period, counted by the computer a command is issued for halting the belts. This restricts the forward travel of the belts when they are "teased", thus valuable storage space is saved.

Either the outer or the inner sensing device also can be used to detect the thickness of a tendered bill in order to validate a pay-in transaction. Each IR sensor can indicate the opacity of a tendered bill between the emitter and the sensor. A valid bill has a predetermined opacity. If more than one bill is between the emitter and sensor, or if the thickness of the tendered bill is not the required thickness, or if the tendered bill is otherwise not genuine, the light transmissivity detected by the optical sensor either can be too high or too low, compared to a required range of opacity for a genuine bill.

Third optical sensors are provided by an infra-red sensor 178 and emitter 179 positioned to the rear of the bill viewing path 142 immediately in front of the first guide roller 136. These sensing device can be optionally used to detect the leading edge of a bill drawn into the bill cache for generating data to be fed to the data processor to issue a command for stopping the pay-in feed operation.

Coin Cache

Figure 6:
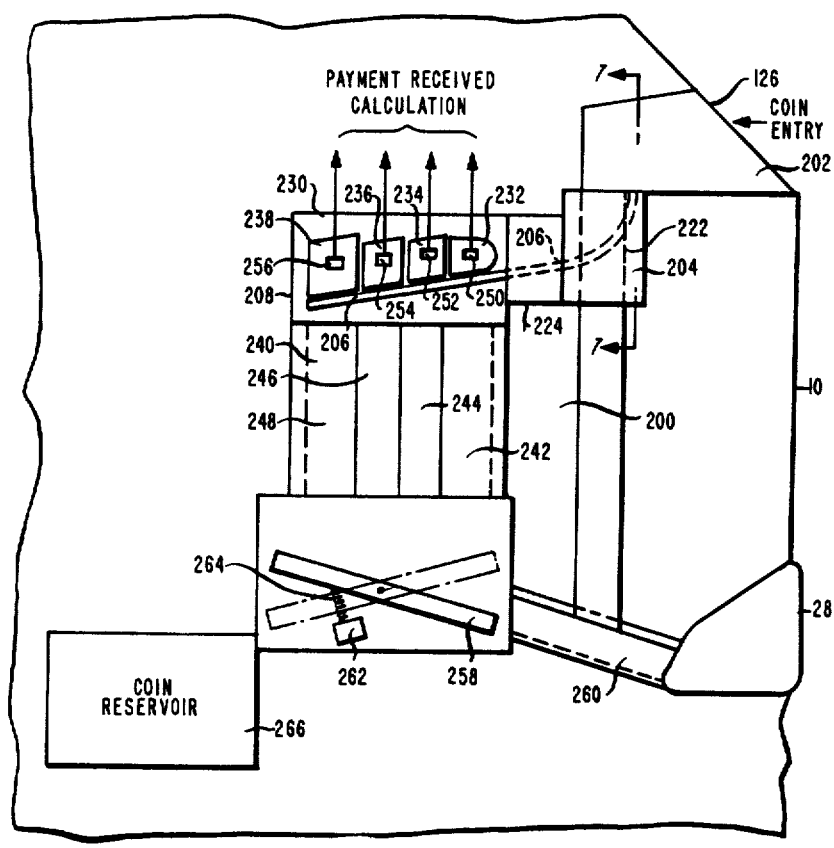
FIGS. 6 and 7 show two views of a coin handling mechanism which forms a portion of the present invention.
Figure 7:
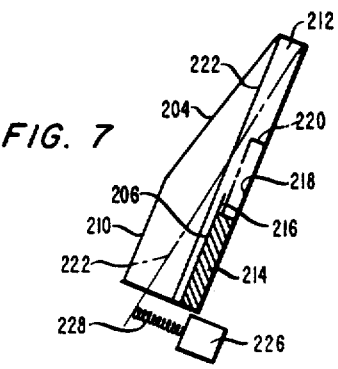

FIGS. 6 and 7 show a coin receiver dispenser and storing device 200 located in the interior of the housing 10. The coin changer includes a coin sorter and a coin dispenser. Coins deposited into the single coin slot 26, shown as 126 in FIG. 6, on the front of the housing 10 travel through a first coin guide 202 for funneling the coins, one at a time, into the top of a second coin guide 204 having a sloping internal track 206 for guiding each coin in to a coin sorter 208.

Separate optical sensors, or mechanical or electrical switches at the coin sorting openings in the coin sorter can detect when a particular coin passes into each opening of the sorter for issuing signals to the computer indicating the denominations of coins received. The computer, in turn, can provide for calculating the payment received. For example, a first optical sensor 250 is located adjacent the dime-sorting opening 232, a second optical sensor 252 is located adjacent the penny-sorting opening 234, a third optical sensor 254 is located adjacent the nickel-sorting opening 236, and a fourth optical sensor 256 is disposed adjacent the quarter-sorting opening 238. The optical signal emitted and sensed by each sensor is blocked when a coin either passes through the opening or bypasses the opening where each sensor is located.

The change dispenser is conventional in structure and operation, and an example of a coin dispenser which can be used for the purpose of the present invention in Model 2941 Change Dispenser manufactured by SCI Systems, Inc. of Huntsville, Ala. Coins dispensed as change by the coin dispenser generate data for the computer to provide a running total of coins available in each column dispenser.

The data processing system also provides for detecting when a coil overflow condition is imminent. When a coil overflow condition is imminent in a given column, the solenoid 252 is energized to pivot the coin diverter 258 in the position shown in phantom lines in FIG. 6 for funneling any further coins that column into a coin reservoir 266. After the coin diverter has diverted the coin to the coin reservoir, the solenoid is de-energized to return the coin diverter to its normal position, under the action of the coil spring 264. Coins of a particular denomination are funneled into the coin reservoir only when an overflow condition for that particular denomination is sensed. If coins are removed from a coin column in the coin dispenser, appropriate data related to the amount of coins removed is supplied to the data processor.

Prompting Display

Figure 8:
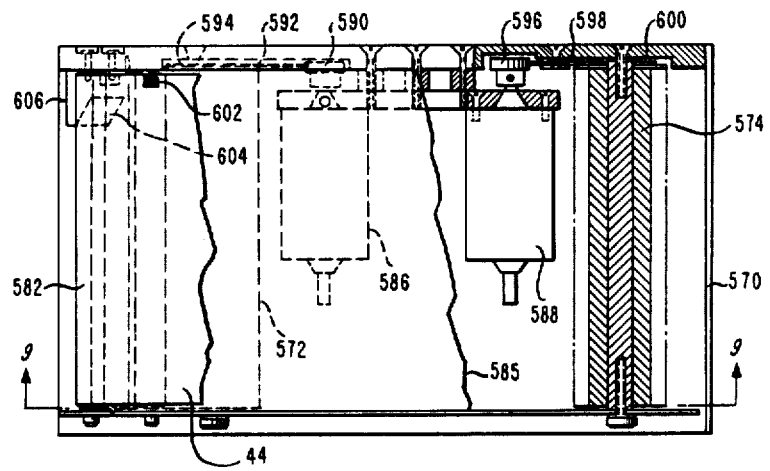
FIGS. 8 and 9 show two views of a prompting display forming a portion of the present invention.
Figure 9:
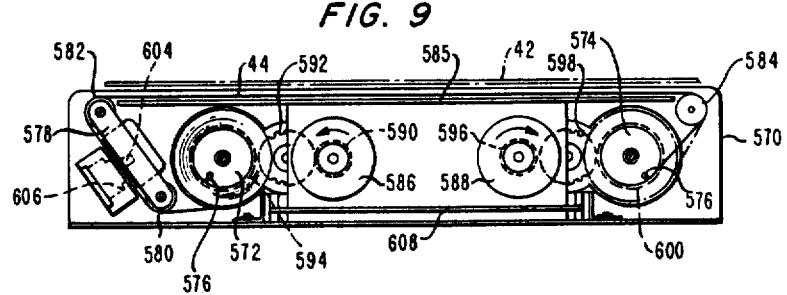

The construction of one embodiment of the prompting display 38 is understood best by referring to FIGS. 8 and 9. The prompting display is contained in a housing 570 shaped generally as an elongated rectangular box having a hollow interior. The prompting display housing is mounted inside the point of sale housing 10 below the window 42 in the keyboard 14. The prompting display housing has an open top, and the portion of the roll 44 which is displayed below the window in the keyboard extends from one end of the prompting display housing to the other end across the top of the housing to the other end of the housing.

The prompting display housing contains first and second rollers 572 and 574 mounted near opposite ends of the housing 570 on bearing members. Each roller has a radial slot 576 for releasably securing ends of the roll 44. A roll tensioner 578, located at one end of the housing adjacent the first roller, has rollers 580 and 582 and a guide roller 584 is located at the other end of the housing.

The upper edges of the tensioner upper roller 582 and the guide roller 584 define a generally horizontal plane of travel, or viewing path, of the roll across the top of the housing. Information displayed on the viewing path of the scroll can be viewed through the window 42 in the keyboard. An elongated generally rectangular-shaped plate 585 covers the open top of the prompting display housing below the viewing path of the roll. The plate has opposite ends closely spaced upwardly from the upper roller 582 and the guide roller 584. The plate 585, closely spaced below the viewing path, holds the roll level and protects the roll from contact with other parts of the prompting display. The tensioner 578 is adjustable.

The first and second rollers 572, 574 are powered by drive motors 586, 588 with gears 590, 592, 594, 596, 588, 600 to drive the roll in either direction.

The length of the entire roll 44 is greater than the length of the viewing portion. As previously described, separate categories of items for sale can be displayed along the length of the roll. For each category a listing of separate items are placed on the roll, and a (numeric) code is associated with each item for use in identifying that item. Each category of item information can be considered a separate page of information, and the pages of information are displayed at separate areas spaced along the length of the roll as a graphic display. The roll is contained on a magazine which can be loaded into the prompting display housing in a manner similar to a player piano scroll.

Separate longitudinally spaced optically readable indexing marks 602 are placed on the roll between adjacent pages. Preferably, each indexing mark is printed on the roll near one edge of the scroll in a space between adjacent pages on the side of the roll having the printed information. The indexing marks are detected by an optical emitter 604 and sensor 606 located in the housing. The optical detectors are used to control a position servo system for positioning the roll so that any selected page of information can be moved to and stopped in the viewing position for display. Logic and control electronics used in the servo system are physically contained on a printed circuit board 608 contained within the lower interior of the prompting display housing.

The roll is moved to the selected page by actuating a corresponding Category key 40 on the keyboard. This supplies data to a servo control within the prompter which provides for issuing a command to either the forward drive motor 586 or to the reverse drive motor 588 to move the scroll in the proper direction for displaying the desired page. The optical sensor 606 supplies data to a counter in the prompting display each time a separate page passes the sensor. The counter counts the required number of pages until the selected page reaches the viewing position, at which time a command is issued for stopping the drive motor. The computer memory can store data relating to the page present in the viewing position to issue the next command to the drive motor for driving the roll in the proper direction through the prompter servo.

Once the selected page has been reached, sale of the selected item or items on the page can be entered by the numeric keys 54 using the two-digit number associated with the selected items as showwm in the graphic display. The combination of page (category) number and item number (three digits) is sufficient data to record and process sale information. Actual prices are determined by means for look-up tables used by the computer. In the embodiment shown, the page number is one digit and the item number is two digits.

Figure 26:
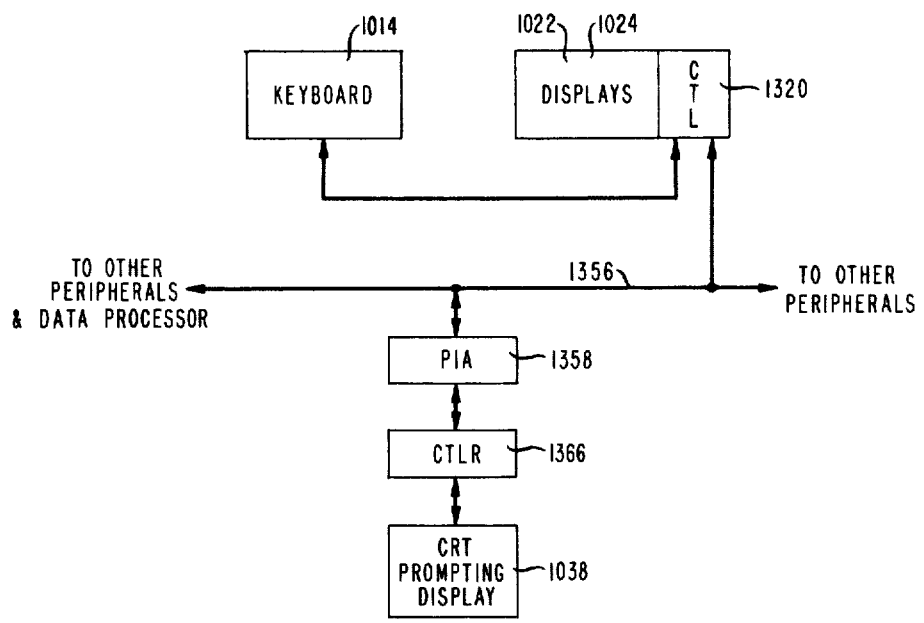
FIGS. 26 and 27 show two further embodiments of prompting displays.
Figure 27:
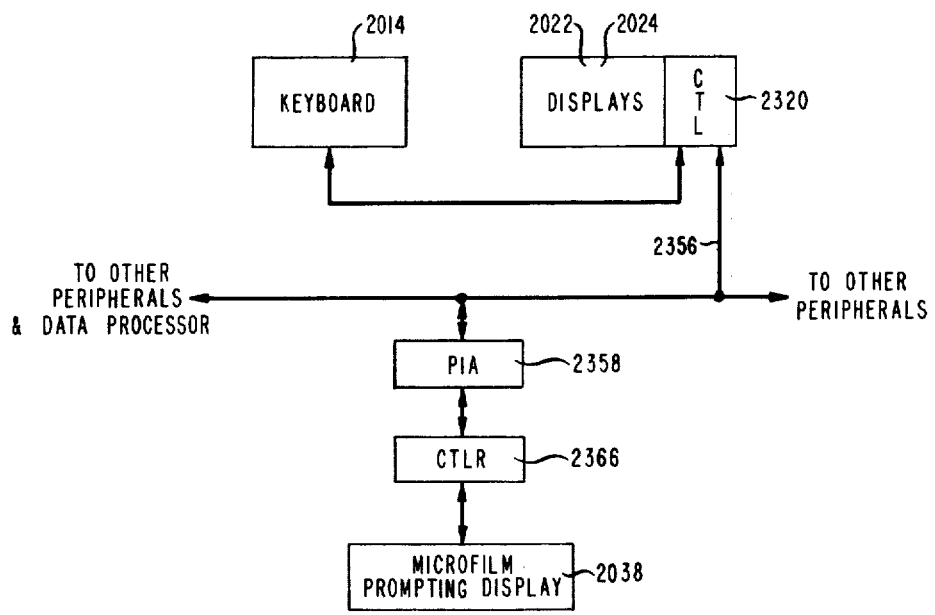

FIGS. 26 and 27 show two other embodiments of the present invention in which different forms of prompting display is used. In FIG. 26, elements which are similar to those shown in FIG. 10 have like numbers preceded by a "1" or a "10" to yield a four digit number. For example keyboards 1014 and 14 in FIGS. 26 and 10 respectively are similar structurally and functionally. FIG. 26 shows that the display can be a CRT 1038 instead of the roll 38 shown in FIGS. 10 and 2. In such an embodiment the data which must be stored to prompt the operator could be stored in the central processor or in a RAM or ROM or any other convenient storage device.

Figure 10:
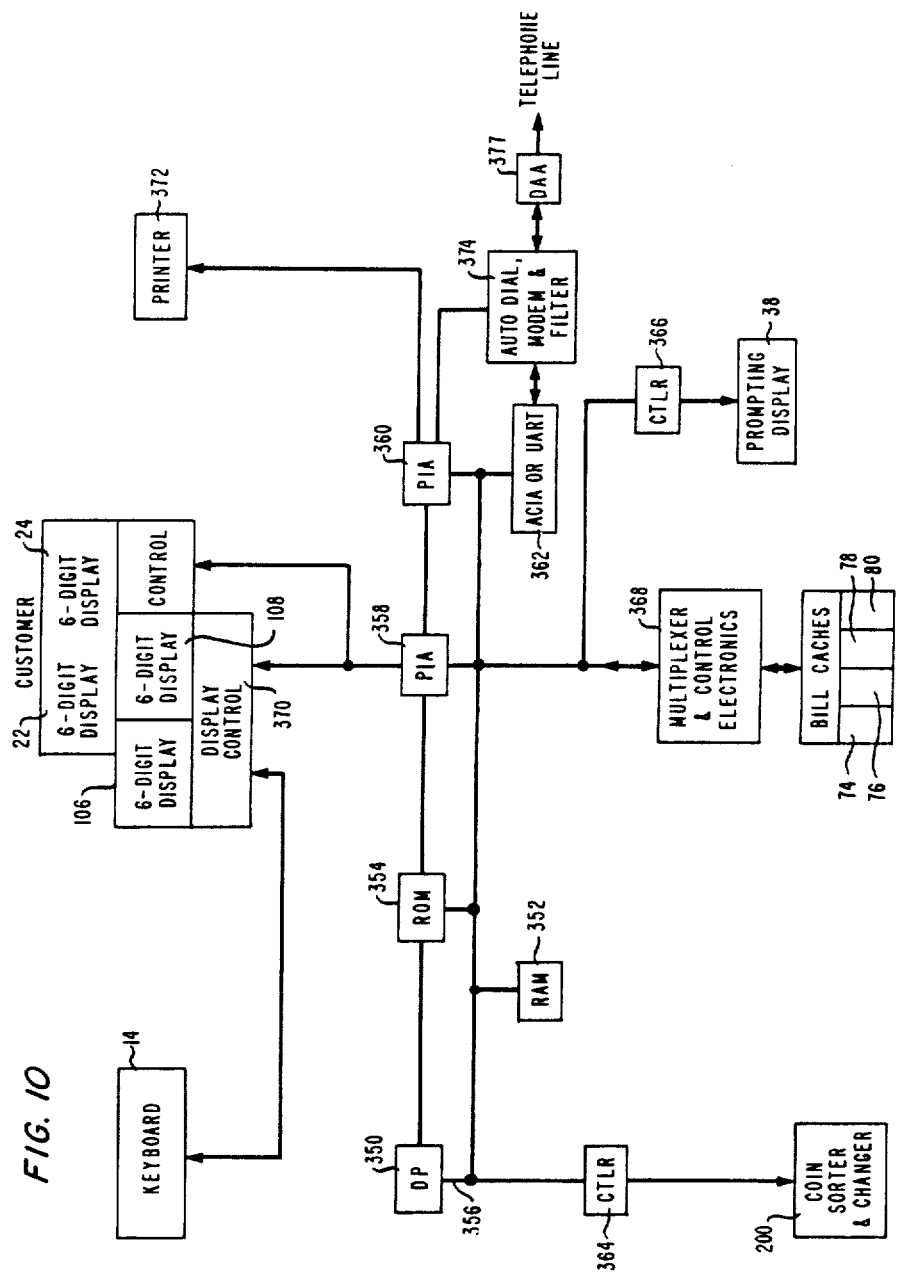
FIG. 10 shows a block diagram of one embodiment of the present invention.

FIG. 27 shows still another embodiment of a prompting display similar to those shown in FIGS. 10 and 26. Similar elements to those in FIG. 26 have like four digit numbers preceded by a "2", i.e., elements 1366 and 2366 perform a like function, are structurally similar and both are similar in structure and function to element 366 in FIG. 10. In FIG. 27, the prompting display is a device to display information stored on micrifilm. Thus, in the FIG. 27 embodiment of the present invention, microfilm would perform the function of the information storage roll 44 shown in FIGS. 8 and 9.

Figure 24:
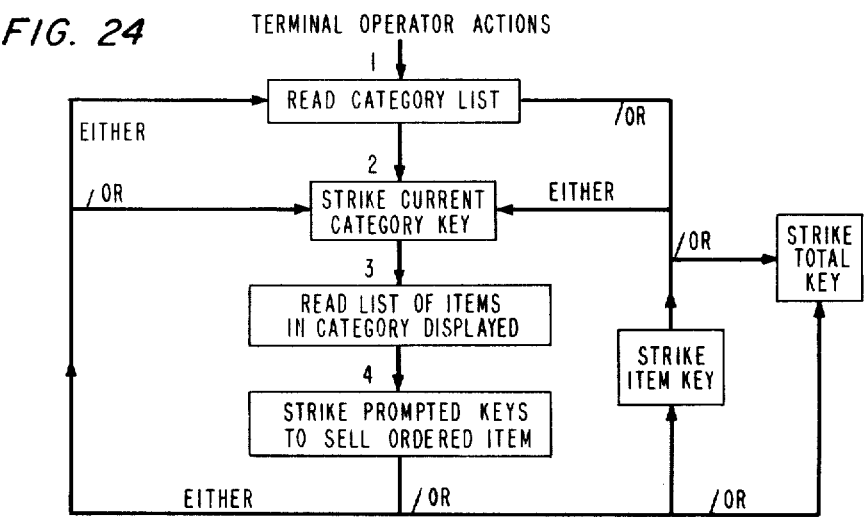
FIG. 24 shows a flow chart showing various phases of a sales transaction using one embodiment of the prompting device forming a part of the present invention.

FIG. 24 shows in block diagram from the novel steps which an operator takes in using the prompting device which forms a part of the present invention. When a customer orders an item, the operator either finds the item on the best seller keys or as shown in block 1 of FIG. 24, reads the category list or, as shown in block 2, selects and strikes the correct category key. Next, as shown in block 3, the operator reads the list of category items displayed. Then, as shown in block 4, the operator strikes the prompted keys to sell the ordered item. The FIG. 24 drawing shows that the operator would then go back through the sequence for the next ordered item or strike an item key or strike a total key.

Organization of Electronic Hardware

With reference to FIG. 10, there will now be generally described the overall organization of the electronic hardware contained in housing 10.

The Computer comprises a data processor 350 and a memory, preferably including a RAM 352 and a ROM 354. It is preferable to split the memory into a random access portion and a read-only portion so that software and system constants can be stored in the read-only memory portion and thereby prevent temporary loss thereof in the event of a power failure or the like. Suitable capacity for RAM 352 is 16K bytes (each byte being 8 bits). Suitable capacity for ROM 354 is 24K bytes.

In the illustrated embodiment of the present invention, data processor 350, RAM 352, and ROM 354 and a battery backed RAM. These products are commercially manufactured by Motorala and others under the designations MC6800 Microprocessing Unit, MCM 4027 Random Access Memory, and Intel Read-Only Memory, (2708 EPROM) respectively. Motorala has published a series of manuals describing the construction and operation of, and various uses for, the MC6800 Microprocessing Unit and various companion products including the MCM 4027 Random Access Memory, and MC 6820 Peripheral Interface Adapter (PIA), the MCM6830 Read-Only Memory, and an MC6850 Asynchronous communication Interface Adapter (ACIA). These manuals include an M6800 EXORciser User's Guide, an M6800 Micrprocessor Programming Manual, an M6800 Microprocessor Applications Manual, and various M6800 Microprocessor Family of Parts data sheets. These materials are incorporated by reference into this specification as fully as if they were reproduced here.

It will be appreciated by those skilled in the art that the above-described specific products are exemplary of various commercially available products suitable for use in the point of sale system. The MC6800 microprocessor incorporates particular structure for performing certain functions such as input/output functions that are performed by different structures in other commercially available systems which are suitable for use with the present invention.

A unibus is depicted in FIG. 10 as bus 356 coupling data processor 350 to RAM 352, ROM 354, a PIA 358, a PIA 360, an ACIA 362, a controller 364, a controller 366, and a multiplexer and control electronics 368. Each PIA is fully described in the above-identified Motorola manuals. Similiarly, the ACIA is fully described therein. PIA 358 provides an interface between data processor 350 and a controller 370 for the keyboard and the displays, and PIA 360 provides an interface for the printer 372 and a modem 374. Modem 374 is coupled to DAA 377 so that data stored in RAM 352 can be transmitted via a telephone line to a central data processing system. Multiplexer 368 is a specially designed interfacing device.

Multiplexer

Figure 11:
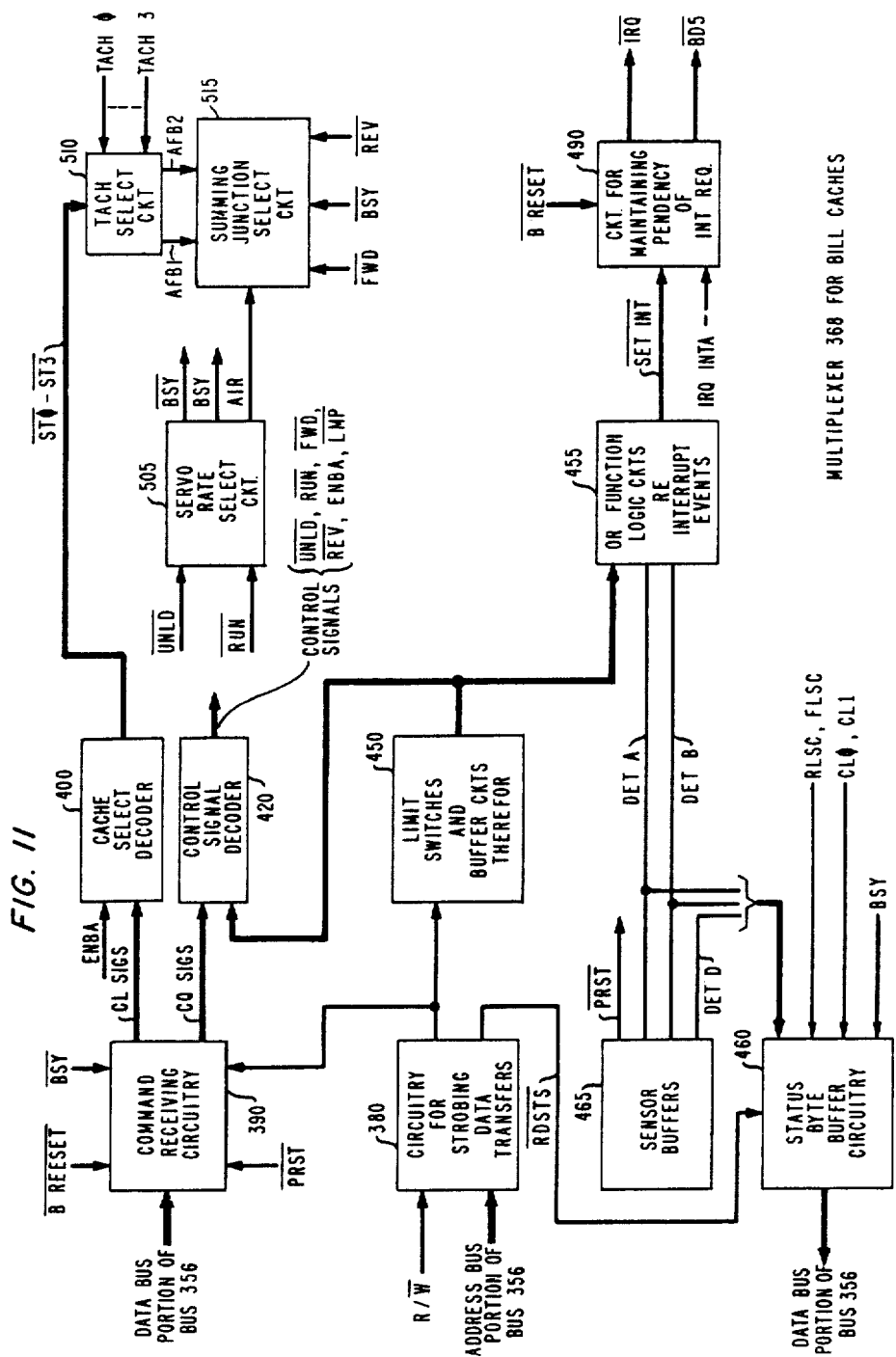
FIG. 11 is a block diagram showing a multiplexer which forms part of the control mechanism used in the present invention.

With reference to FIG. 11, multiplexer 368 is connected to bus 356 to receive addresses and commands from date processor 350 and to feed status data back to data processor 350. The address bus portion of bus 356 comprises 16 wires (not individually shown). More than 64K separate addresses can be instantaneously defined by the parallel-by-bit signals carried by the address bus, each address is symbolized by a four place hexidecimal number. For example, in the specifically described embodiment, the address of multiplexer 368 has been arbitrarily chosen as the four place hexidecimal number 80E1. Numbers that expressed in hexidecimal form are indicated by the letter H or a "$" preceding the number.

The addresses applied to bus 356 by data processor 350 are in accordance with a positive logic format subject to three-state control (TSC). That is, each of the 16 address bus wires is connected to the output of one of 16 three-state buffer circuits within data processor 350.

Whenever data processor 350 applies an address to theaddress bus, it simultaneously controls the value of an R/W signal to designate whether a read or write operation is involved.

Multiplexer 368 has circuitry for strobing data transfers, herein referred to as strobing circuitry 380 with positive logic format.

Figure 12:
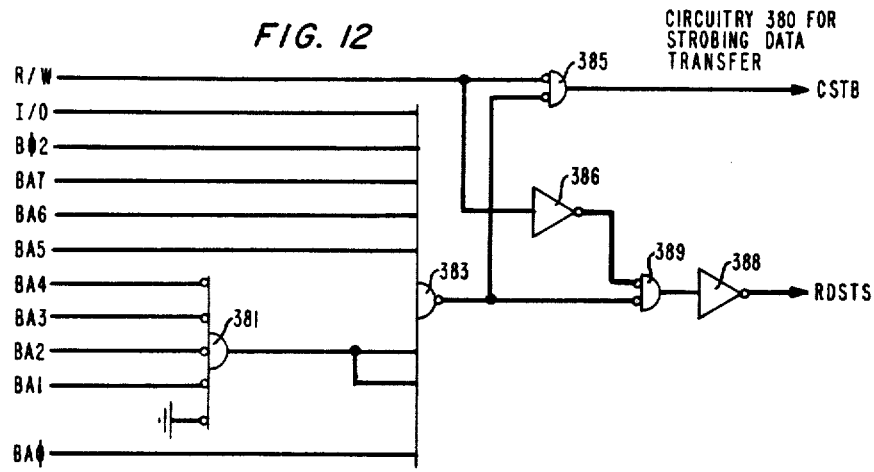

A suitable arrangement of digital circuits which is used in the illustrated embodiment for producing the above-mentioned strobing signals is shown in detail in FIG. 12. A NOR gate 381 (such as one-half of type 74LS260) receives five input signals and produces an output signal that is high (at or near +V1) only when each of its five input signals is low (at or near ground). A NAND gate 383, (such as type 74LS30) receives eight input signals and produces an output signal that is low only when each of its eight input signals is high. The above-mentioned input signals include signals identified as BA$\phi$ through BA7, (which are the eight least significant bits of the address carried by the address bus), and an I/O signal produced by decoding circuitry. The I/O signal equals 1 when the eight most significant bits of the address define the number With gates 381 and 383 being connected as shown, the output signal produced by gate 383 is low whenever the address H80E1 is carried by the address bus.

NOR gate 385 ($\frac{1}{4}$ of type 74LSO2) received two input dignals and its output is the CSTB signal-which in when high the computer issues a command to multiplexer 368.

The R/W signal is inverted by an inverter 386 whose output signal is applied as one of two input signals to a NOR gate 387. The other input signal for NOR gate 387 is received from NAND gate 383. The output signal produced by NOR gate 389 is inverted by an inverter 388 to produce the RDSTS signal. Owing to the foregoing arrangement, the RDSTS signal equals 0 whenever data processor 350 addresses multiplexer 368 for a read operation to read status data.

With reference again to FIG. 11, multiplexer 368 has command receiving circuitry 390 that is strobed by the CSTB signal. A suitable arrangement of digital circuitry which is used in the illustrated embodiment for receiving commands is shown in detail in FIG. 15. Each command issued by data processer 350 to multiplexer 368 is carried by a portion of bus 356. The data bus portion comprises eight bidirectional lines for carrying signals identified as BD$\phi$ through BD7 respectively. Of these, the signals BD0 through BD4 are involved in defining the commands issued to multiplexer 368.

Table 1 below gives the coding for the commands issued to multiplexer 368.

TABLE 1

| BD4 | BD3 | BD2 | BD1 | BD0 | |
|-----|-----|-----|-----|-----|---|
| X | X | X | H | H | select belt 74 ($1) as scanned |

TABLE 1-continued

| BD4 | BD3 | BD2 | BD1 | BD0 |   |
|-----|-----|-----|-----|-----|---|
| X | X | X | H | L | select belt 76 ($5) as scanned one |
| X | X | X | L | H | select belt 78 ($10/20) as scanned one |
| X | X | X | L | L | select belt 80 (coupon) as scanned one |
| X | H | H | X | X | stop |
| X | H | L | X | X | forward |
| X | L | H | X | X | reverse |
| X | L | L | X | X | unload |
| L | X | X | X | X | arm |
| H | X | X | X | X | disarm |

Command receiving circuitry 300 includes five inverters 391-1 through 391-5 for inverting the five parallel signals defining the commands issued to multiplexer 368. The signal produced by inverter 391-5 is applied to the D input of a D-type flip flop 392 (one quarter of 74LS74). An inverter 391-6 responsive to the CSTB signal has its output connected to the clock input of flip flop 392. Accordingly, when data processor 350 issues an arming command to multiplexer 368, flip flop 392 is triggered into its set state, and when data processor issues a disarming command to multiplexer 368, flip flop 392 is triggered into its reset state. Flip Flop 392 can also be cleared by the B RESET signal carried by bus 356.

An AND gate 393 is responsive to the output signal produced by flip flop 392 and to a $\overline{PRST}$ signal. Gate 939 is normally high and is low only for a brief interval such as approximately 100 milliseconds following initial application of power to the electronic hardware. The signal produced by AND gate 393 is the ENBA signal which is a mode control signal.

The ENBA signal is applied to the clear input of a register 394 (type 74LS175) comprising four D-type flip flops (not individually shown). So long as the ENBA signal equals 0, thereby defining the disabled mode, each of the flip flops in register 394 is held in the reset state. With the ENBA signal equalling 1, register 394 is responsive to triggering by the CSTB signal, with each such trigger causing the register to be loaded with a command issued by data processor 350 for controlling a selected one of the bill caches 74, 76, 78, and 80.

Command receiving circuitry 390 further includes a copy/latch register 395 (type 7475) comprising four latch circuits (not individually shown). Copy/latch register 395 receives a $\overline{BSY}$ signal which equals 0 only during intervals of time during which an electrical energization pulse is being applied to cause the scanned one of the bill belts to be driven. With the $\overline{BSY}$ signals equaling 0, copy/latch register 395 exhibits memory. During the intervals in which the $\overline{BSY}$ signal equals 1, each of the four latch circuits in copy/latch register 395 copies the output signal of a corresponding one of the four flip flops in register 394.

Figure 17:
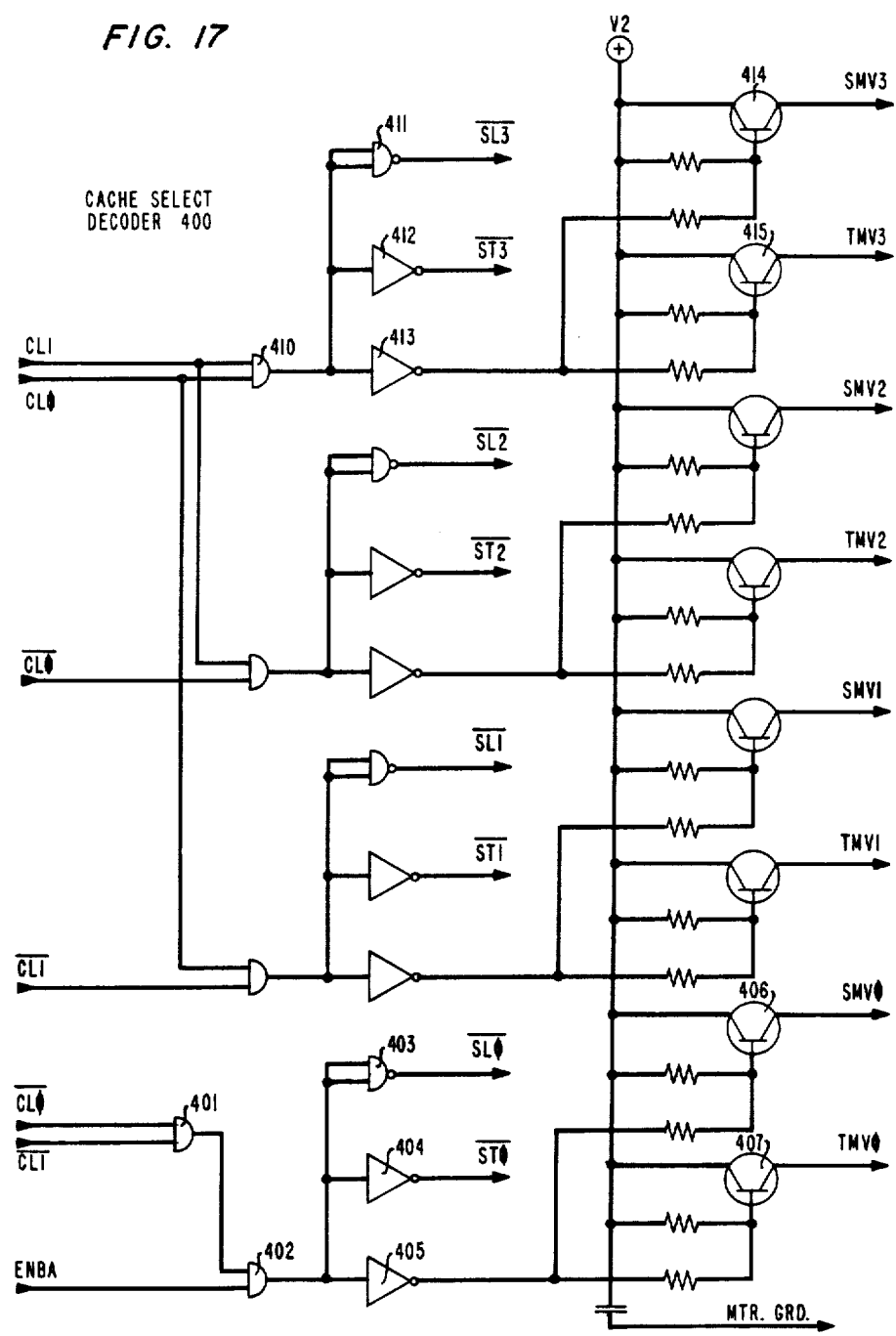

With reference again to FIG. 11, multiplexer 368 includes a belt (cache) select decoder 400 for decoding the bill belt identifying portion of each command issued to multiplexer 368. A suitable arrangement of digital circuitry which is used in the illustrated embodiment for effecting such decoding is shown in detail in FIG. 17. An AND gate 401 receives the $\overline{CL\phi}$ and $\overline{CL1}$ signals and produces an output signal that is applied to an AND gate 402. The ENBA signal is also applied to AND gate 402. The output signal produced by AND gate 402 is applied to three inverters 403, 404, and 405. Inverters 403 and 404 produce output signals $\overline{SL\phi}$ and $\overline{ST\phi}$, respectively. Inverter 405 has its output resistively connected to the base electrodes of power transistors 406 and 407. When power transistor 406 is switched on, it connects a source of power +V2, suitably +12 volts unregulated, to one terminal SMV$\phi$ of the series-connected supply reel drive motors in bill cache 74. At the same time that transistor 406 is switched on, power transistor 407 is switched on to connect the source of power to one terminal TMV$\phi$ of the take-up drive motor in bill cache 74.

During intervals in which the disabled mode is being defined by the ENBA signal, copy/latch register 395 (FIG. 15) identifies bill belt 74. Inasmuch as AND gate 402 is responsive to the ENBA signal, however, neither power transistor 406 nor power transistor 407 is switched on in the disabled mode.

Decoder 400 further includes three decoding arrangements that are structurally identical to each other and are substantially similar to the above-described decoding arrangement concerning bill belt 74. The only difference in structure arises because there is no need for the decoding arrangements for bill belts 76, 78, and 80 to respond to the ENBA signal. Inasmuch as these three decoding arrangements are structurally identical to each other, only one of them is described. An AND gate 410 receives the CL$\phi$ and CLI signals and produces an output signal that is applied to inverters 411, 412, and 413. Inverters 411 and 412 produce output signals $\overline{SL3}$ and $\overline{ST3}$ respectively. Inventer 413 has its output resistively connected to the base electrodes of power transistors 414 and 415 that control the switching of power to the supply and take-up drive motors in bill cache 80 in the same manner as power transistors 406 and 407 do so for bill belt 74.

Figure 16:
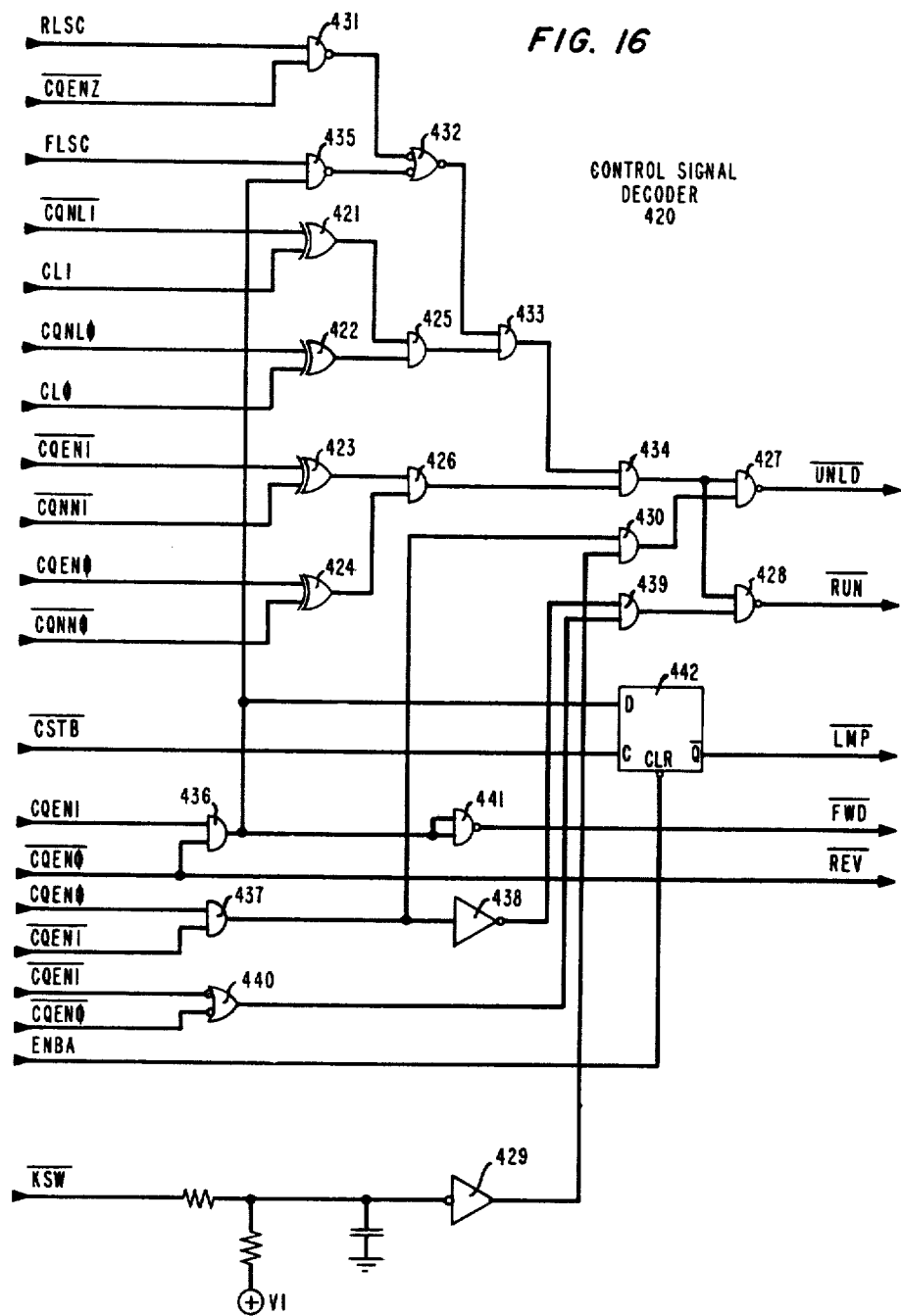

Six of the gates shown in FIG. 16 (which shows the decoder 402) are involved in detecting whether the existing command equals the next command. There are exclusive-OR gates 421, 422, 423, and 424 and AND gates 425 and 426. In circumstances in which the existing command equals the next command, the output signals produced by AND gates 425 and 426 each equals 0, two of the control signals produced by decoder 420, namely, $\overline{UNLD}$ signal produced by a NAND gate 428, each equals 1.

The $\overline{UNLD}$ signal is involved in controlling a high-speed dump operation by which a store owner or manager empties a bill belt. As a security measure, housing 10 has a key-controlled lock (not shown) used for controlling a $\overline{KSW}$ signal. An inverter 429 receives the $\overline{KSW}$ signal and produces an output signal that is applied to an AND gate 430. Owing to the connection as shown between AND gate 430 and NAND gate 427, the $\overline{UNLD}$ signal cannot equal 0 unless the $\overline{KSW}$ equals 0.

When the storage reel has reached its maximum diameter or the supply reels have reached their maximum diameter, NAND gate 431 receives an RLSC signal produced by circuitry to be described with reference to FIG. 19. Exclusive OR gate 424 and AND gate 437 receive the CQEN$\phi$ signal produced by the circuitry described above with reference to FIG. 15. In circumstances in which the existing command calls for a bill belt to unload at a time while the RLSC signal equals 0. In such circumstances, AND gates 432, 433, and 434, which are connected in tandem as shown between NAND gate 431 and NAND gate 427, cause the UNLD signal to equal 1. Under the same conditions NAND gate 435 receives a FLSC signal also produced by the circuitry shown in FIG. 19, and receives the output signal produced by an AND gate 436. Consider now circumstances in which the existing command calls for a bill belt to move forward at a time while the FLSC signal equals 1. In such circumstances, the CQEN1 and the CQENφ signals each equals 1, whereby the output signal produced by AND gate 436 also equals 1. Owing to the connection as shown of the tandem gates between AND gate 436 and NAND gate 428, the RUN signal equals 1 in these circumstances.

Figure 19:
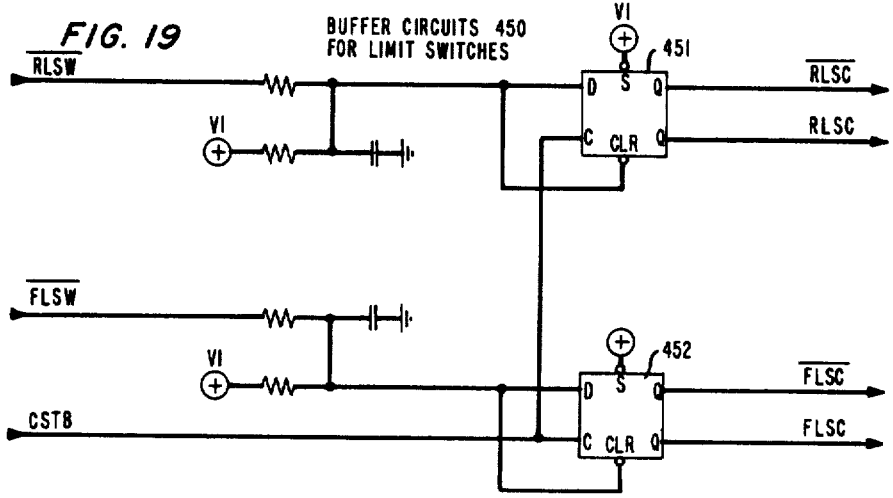

A suitable arrangement of such buffer circuits 450 used in the illustrated embodiment is shown in detail in FIG. 19. As shown, two D-type flip flops 451 and 452 are included in these buffer circuits. When the supply reels of the scanned bill belts have reached maximum diameter, its reverse limit switch causes an RLSW signal to equal 0. This signal is coupled through an RC delay circuit to the clear input of flip flop 451. Accordingly, while the supply reels are at maximum diameter, flip flop 451 is in its reset state causing an RLSC signal to equal 1 and an RLSC signal to equal 0. The flip flop is triggered into its set state when a command issues to multiplexer 368, thereby causing the CSTB signal to define a positive pulse, at a time while the RLSW signal equals 1 thereby causing the CSTB signal to define a positive pulse, at a time while the RLSW signal equals 1 thereby indicating that the supply reels are not at maximum diameter.

Figure 20:
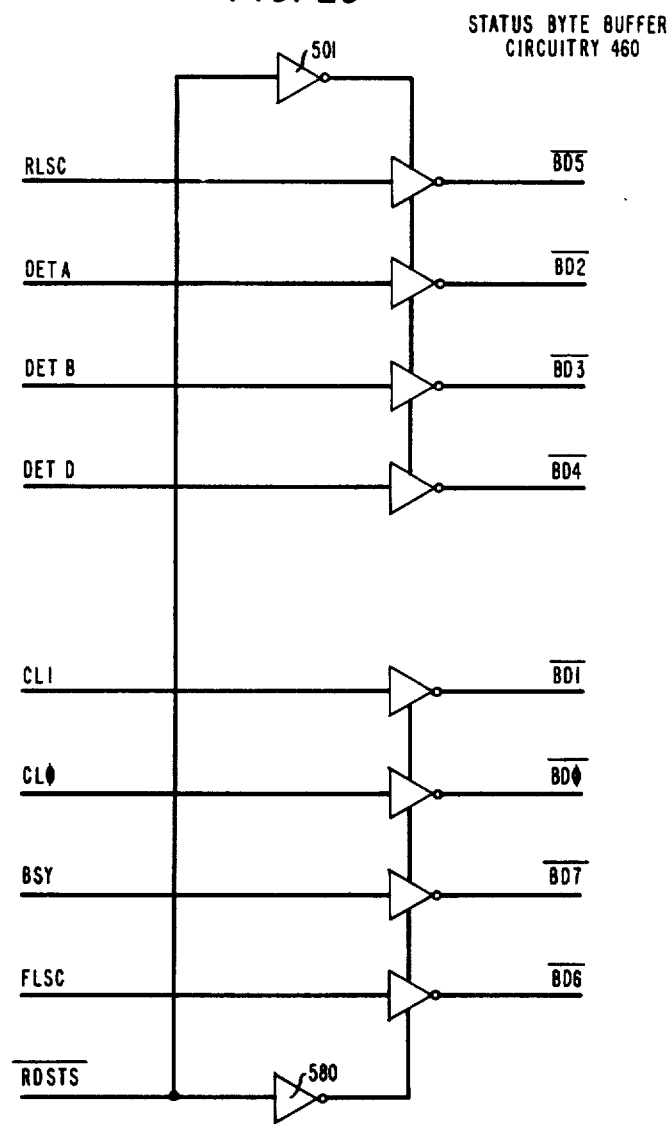

Similarly, when the take-up reel of the scanned bill belt has reached maximum diameter, its forward limit switch causes an FLSW signal to equal 0. This signal is coupled through an RC delay circuit to the clear input of flip flop 452. Accordingly, while the take-up reel is at maximum diameter, flip flop 452 is in its reset state, causing the FLSC signal to equal 1 and the FLSC signal to equal 0. Flip flop 452 is triggered into its Set state when a command issues to multiplexer 368, thereby causing the CSTB signal to define a positive pulse, at a time while the FLSW signal equals 1 thereby indicating that the supply reels are not at maximum diameter. The above-described four output signals of buffer circuits 450 are distributed to control signal decoder 420, to OR function circuitry 455 (FIGS. 11 and 13), and to status byte buffer circuitry 460 (FIGS. 11 and 20).

Figure 18:
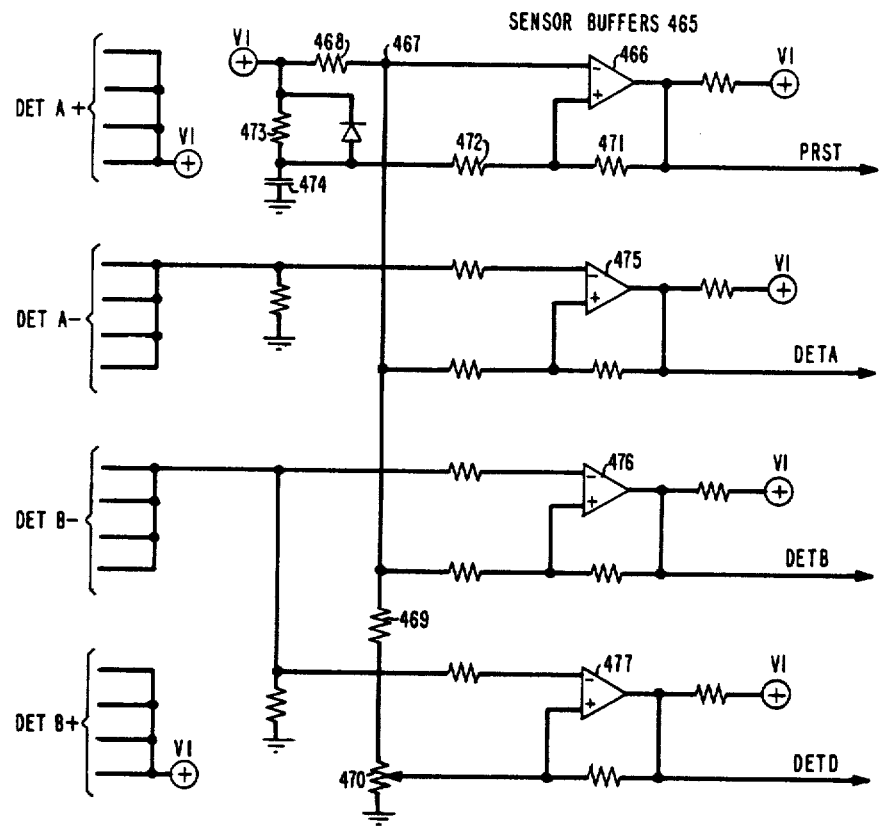

A suitable arrangement of such sensor buffers used is illustrated. The principal function of the circuitry of FIG. 18 relates to sensor buffering, the circuitry also provides for producing the PRST signal which is used to initialize the states of various bistable circuits incident to the turning on of power. In this connection, the sensor buffer 465 of FIG. 18 includes a comparator circuit 466 (type 6M339) whose output signal is the PRST signal. The inverting input of comparator circuit 466 is connected to a node 467 of a resistor divider network comprising resistors 468 and 469 and potentiometer 470. The non-inverting input of comparator circuit 466 is connected to a positive feedback arrangement of resistors 471 and 472. When power is turned on, the voltage level at node 467 of the resistor divider network rapidly changes to its steady state value. On the other hand, a delay circuit comprising a resistor 473 and a capacitor 474 supplies a relatively slowly changing voltage to resistor 472. For approximately the first 100 milliseconds after power is applied, the voltage at node 467 exceeds the voltage applied to resistor 472 with the result that the PRST signal equals 0 for this brief interval. At the end of this brief interval, which ends as soon as the voltage to resistor 472 exceeds the voltage at node 467, the PRST signal changes to the 1 value. The positive feedback arrangement causes the pulse defined by the PRST signal to have sharp rise and fall times.

Identical comparator circuits 475 and 476 are likewise connected to positive feedback arrangements for causing the output signals they produce, identified as DET A, and DET B, to have sharp rise and fall times. The noninverting inputs of comparator circuits 475 and 476 are coupled by resistors of their positive feedback arrangements to the node 467. The inverting input of comparator circuit 475 is resistively coupled to the terminal identified as DET A-. It will be recalled from the description of the outer IR sensors, set forth in the section directed to the construction of a bill cache, that the emitter electrodes of the four emitter electrodes are commonly connected to this terminal.

While any one of the four signals SLφ through SL3 (FIG. 17) equals 0, the signal applied to this terminal normally is more positive than the steady state voltage at node 467. If a bill is present in the scanned bill belt between its IR emitter 175 and its sensor 174, this signal becomes less positive, with the result that the output signal DET A becomes equal to 1. In like manner, the inverting input of comparator circuit 476 is resistively coupled to receive a signal applied to the DET B-terminal. This signal is controlled by the inner IR sensor of the scanned bill belt to be normally more positive than the steady state voltage at node 467. If a bill is present in the scanned bill belt, between its IR emitter 177 and its sensor 176, this signal becomes less positive with the result that the output signal DET B becomes equal to 1. Another comparator circuit 477 has a single positive feedback register and has its non-inverting input connected to the tap of potentiometer 470. The inverting input of comparator circuit 477 is resistively coupled to the DET B- terminal. Owing to this arrangement, whenever the inner sensor of the scanned bill cache detects a double bill, the DET D signal becomes equal to 1.

The logic circuitry 455 cooperates with other circuitry described below with reference to FIG. 14 to generate an interrupt request supplied to data processor 350. The DET A signal is inverted by an inverter 480 whose output signal is applied to a delay circuit generally identified at 481. The output signal of delay circuit 481 is inverted by inverter 482. One input of exclusive OR gate 482 is directly connected to the output signal of inverter 482, and the other input is coupled through delay circuit 484 to receive the same signal. Thus, whenever the DET A signal changes from 0 to 1 or changes from 1 to 0, the output signal produced by gate 483 is positive.

NOR gate 485 responds to each positive pulse to cause its output signal, (SET INT) to a negative pulse. Whenever the leading edge or trailing edge of a bill passes the outer sensor of the scanned bill belts, the SET INT signal will change from its normal 1 to a temporary 0 and then return to its normal 1.

Figure 22:
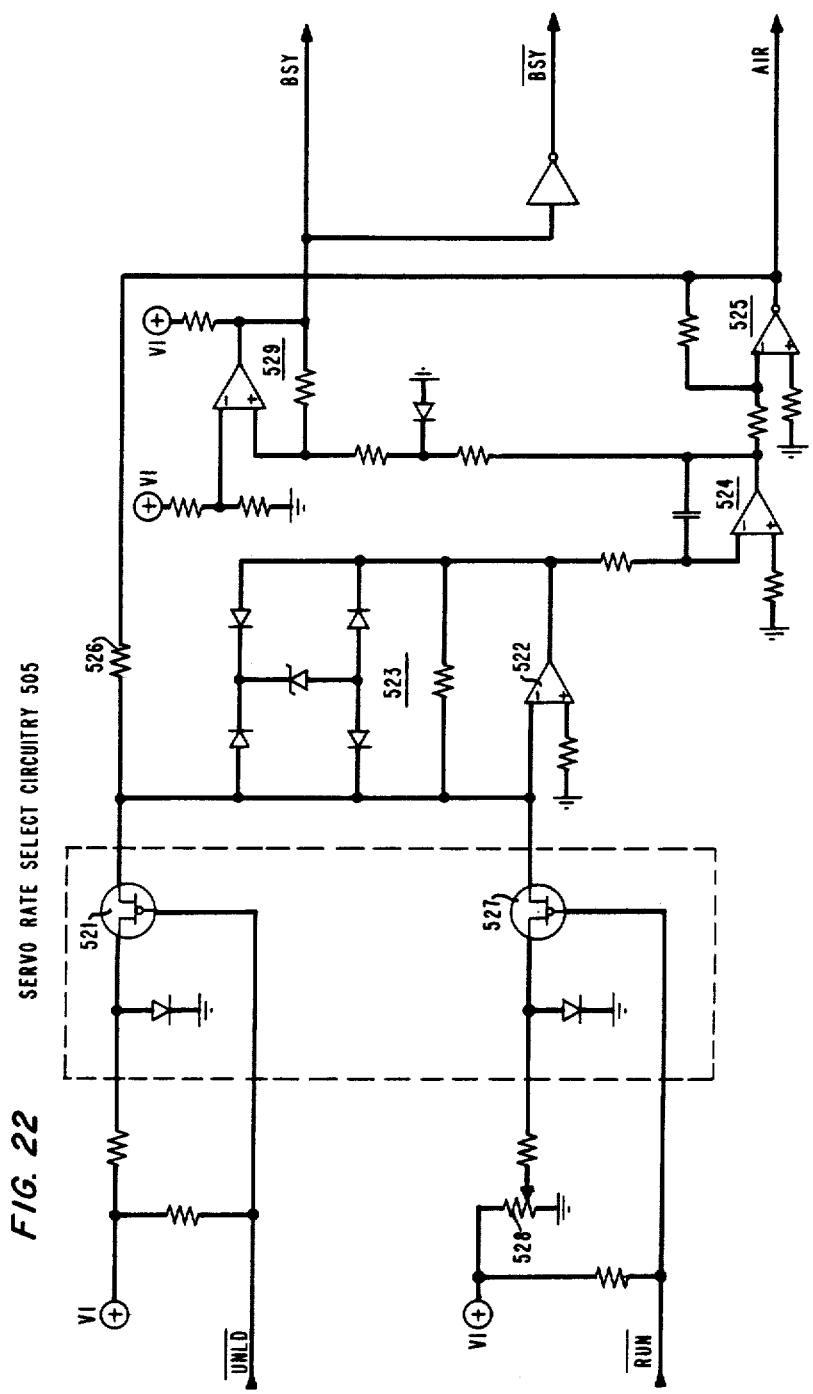

An arrangement structurally identical to the foregoing performs the same function with respect to the inner sensor. Whenever a change from either a 1 to a 0 or from a 0 to a 1 occurs in the DET B signal, a negative going pulse is defined in the SET INT signal. A BSY signal, produced by circuitry to be described with reference to FIG. 22, is applied to an inverter 486 whose output is coupled through a differentiating circuit generally identified at 487 to NOR gate 485. Whenever the BSY signal changes from 1 to 0, a negative going pulse is defined in the $\overline{\text{SET INT}}$ signal.

Figure 13:
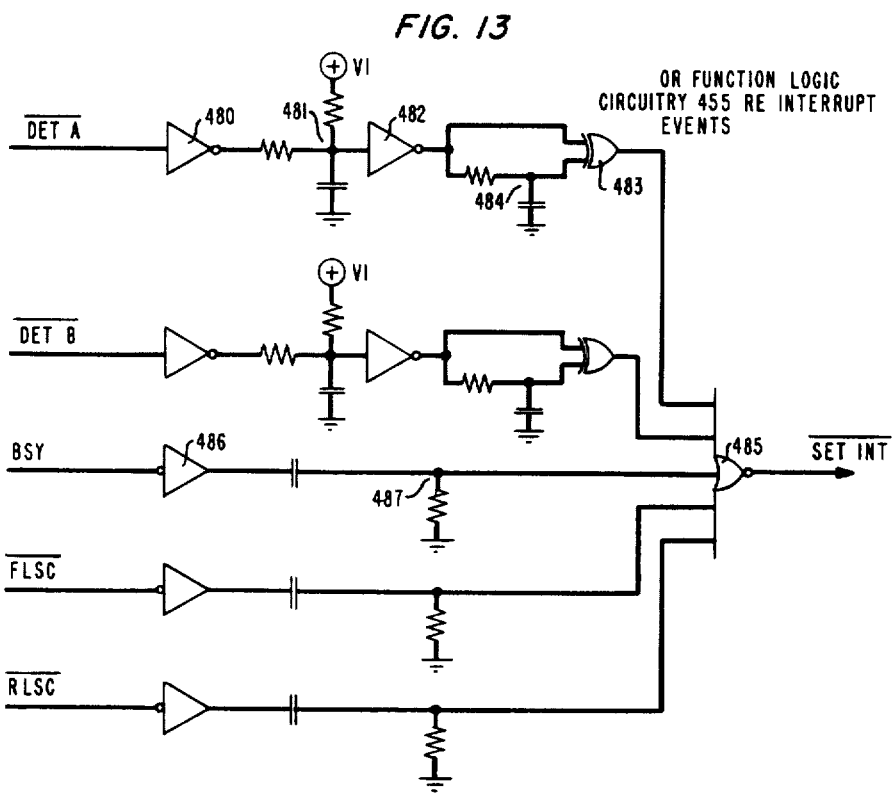

The remaining circuitry shown in FIG. 13 provides separate signal flow paths, each of which is structurally identical to the signal flow path described above with reference to the BSY signal, so that the $\overline{\text{SET INT}}$ signal is responsive to the $\overline{\text{FLSC}}$ and the $\overline{\text{RLSC}}$ signals in the same manner that is responsive to the BSY signal.

Circuitry 490 receives several input signals, including the $\overline{\text{SET INT}}$ signal produced by OR function circuitry 455, and applies two output signals identified as $\overline{\text{IRQ}}$ and $\overline{\text{BD5}}$ to two of the wires of the bus 356.

In FIG. 14 a D-type flip flop 491 has a direct set input that receives the $\overline{\text{SET INT}}$ signal so that each time a negative going pulse is defined in the $\overline{\text{SET INT}}$ signal, flip flop 491 is placed into its set state. A NAND gate 492 receives the output signal of flip flop 491 and an $\overline{\text{ID}}$ signal produced by inverter 493. The input of inverter 493 is connected to one of the wires of bus 356 to receive an IRQ INT a signal. Normally, the latter signal equals 0; it equals 1 only when data processor 350 acknowledges an interrupt request and seeks to ascertain the identity of the peripheral that generated the interrupt request. A D-type flip flop 494 has a direct set input that receives the signal produced by NAND gate 492. Thus, flip flop 494 is placed into its set state each time a negative going pulse is defined in the $\overline{\text{SET INT}}$ signal. An inverter 495 produces the $\overline{\text{IRQ}}$ signal which, while it equals 0, indicates that an interrupt request is pending. When data processor 350 acknowledges the interrupt request by causing a positive going pulse to be defined in the IRQ INT A signal, an inverter 496 enables a three-state gate 497 to drive one of the wires of the data bus portion of bus 356. While so enabled, three-state gate 497 causes the $\overline{\text{BD5}}$ signal to equal 0 which serves to inform data processor 350 that it is multiplexer 368 that is generating the interrupt request.

One of the wires of bus 356 carries a $\overline{\text{B RESET}}$ signal produced by data processor 350. Normally, this signal equals 1. Flip flop 494 has a direct clear input for placing flip flop 494 into its reset state each time the $\overline{\text{B RESET}}$ signal equals 0. Flip flop 494 is normally triggered into its reset state by the trailing edge of the positive pulse defined in the $\overline{\text{ID}}$ signal when data processor 350 seeks to ascertain the identity of the source of the interrupt request.

After data processor 350 has acknowledged an interrupt request and ascertained that it is multiplexer 368 that is the source of the interrupt request, data processor 350 executes a read cycle operation during which status data is entered into data processor 350. In this connection, consider FIG. 20. It will be recalled from the description of FIG. 12 that the $\overline{\text{RDSTS}}$ signal equals 0 while data processor 350 causes the R/$\overline{\text{W}}$ signal to equal 1 and simultaneously addresses multiplexer 368. The $\overline{\text{RDSTS}}$ signal is applied to two inverters 500 and 501 each of which controls a group of four three-state gates. The format of each status byte applied to the data bus portion of bus 356 is evident from FIG. 20.

The remaining circuitry included within multiplexer 368 provides a time-shared servo subsystem for the bill caches. This subsystem includes, as generally shown in FIG. 11, servo rate select circuitry 505, tach select circuitry 510, and summing junction select circuitry 515.

Figure 21:
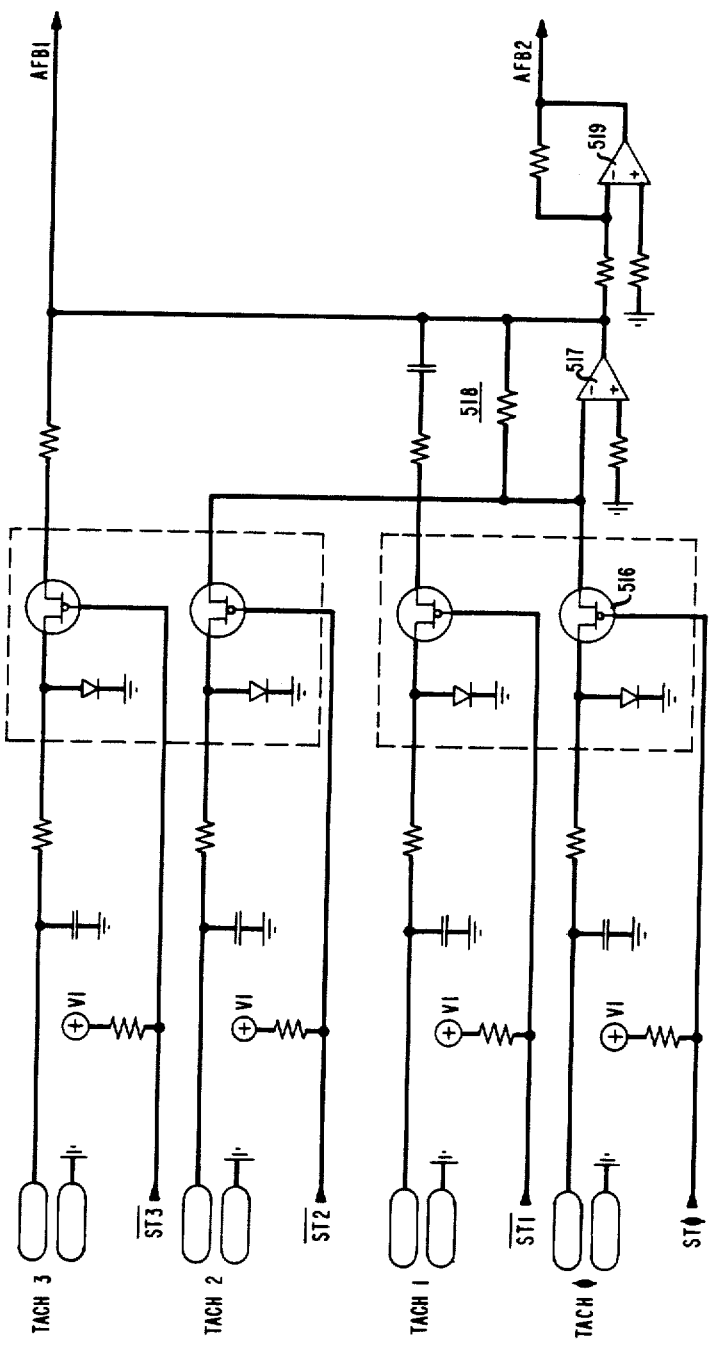

A suitable arrangement of tach select circuitry 510 used in the illustrated embodiment is shown in detail in FIG. 21. It will be recalled from the description of FIG. 4 that each bill belt includes a tachometer. In FIG. 21, the signals produced by the four identical tachometers are identified as tack $\phi$ (the one in bill belt 74), tach 1 (the one in bill belt 76), tach 2 (the one in bill belt 78), and tach 3 (the one in bill belt 80).

When the existing command identifies bill belt 74, the $\overline{\text{ST}\phi}$ signal equals 0. An fet 516 receives the $\overline{\text{ST}\phi}$ signal at its gate electrode and is switched on while the $\overline{\text{ST}\phi}$ signal equals 0. The source and drain electrodes of fet 516 are connected in a series circuit path between tach $\phi$ and the inverting input of an analog operational amplifier 517 whose output is identified as AFB1 (AFB is an acronym for Analog Feedback). As shown, a conventional servo compensation network 518 is provided to control the gain provided by amplifier 517. An inverting unity gain circuit comprising operational amplifier 519 responds to the AFB1 signal to produce an AFB2 signal which is 180 degrees out of phase from the AFB1 signal.

Three other fet-switched series circuit paths, each identical in structure to the above-described series circuit path for tach $\phi$, are provided for selectively coupling the tach 1 through tach 3 signals to amplifier 517. These three series circuit paths are controlled by the $\overline{\text{ST1}}$ signal, the $\overline{\text{ST2}}$, and the $\overline{\text{ST3}}$ signal, respectively.

Servo Rate Select Circuit 505 shown in FIG. 22 is controlled by signals $\overline{\text{UNLD}}$ and $\overline{\text{RUN}}$, and produces an analog signal AIR (an acconym for Analog Input Rate). The time-shared servo controls the angular velocity of a bill cache drive motor in accordance with a magnitude of the AIR signal. For the high speed dump operation, it is desirable that angular velocity be relatively high; a lower angular velocity is more desirable in connection with either of the pay-in or pay-out modes of the bill caches.

The $\overline{\text{UNLD}}$ signal equals 0 while the security key switch is actuated and the existing command is an unload command. An FET 521 receives the $\overline{\text{UNLD}}$ signal at its gate electrode and is switched on while the $\overline{\text{UNLD}}$ signal equals 0. The source and drain electrodes of FET 521 are connected in a series circuit path between +V1 and the inverting input of an operational amplifier 522. The gain of amplifier 522 is controlled by a conventional feedback circuit generally indicated at 523. The output signal produced by amplifier 522 is applied to an integrator generally indicated at 524. Suitably, the RC time constant of integrator 524 is between a half a second and one second. The output signal produced by integrator 524 is applied to an inverting, unity gain amplifier generally indicated at 525 whose output signal is the AIR signal. The AIR signal is applied also to one end of a feedback resistor 526, the other end of which is connected to the inverting input of amplifier 522.

The $\overline{\text{RUN}}$ signal equals 0 while the existing command is either a Forward command or a Reverse (normal speed) command. AN FET 527 receives the $\overline{\text{RUN}}$ signal at its gate electrode and has its source and drain electrodes connected in a series circuit path between a potentiometer 528 and the inverting input of amplifier 522. FET 527 is switched on only while the RUN signal equals 0.

While neither the $\overline{\text{RUN}}$ nor the $\overline{\text{UNLD}}$ signals equals 0, the AIR signal has a steady state value of 0. When a command is decoded to cause the $\overline{\text{RUN}}$ signal to change to 0, FET 527 switches on, the magnitude of the AIR signal increasees positively to define a ramp for an interval whose duration is fixed by the time constant of integrator 524. At the end of that interval, the input to integrator 524 will be null. Owing to the memory provided by integrator 524, however, the AIR signal will have a positive value proportional to the setting of potentiometer 528. In a similar manner, when data processor 350 issues a Stop command that is decoded to cause the $\overline{\text{RUN}}$ signal to change back to 1, the AIR signal will define a descending ramp to its steady state value of 0 volts.

The same kind of leading and trailing ramp is defined in response to a cycle of the $\overline{\text{UNLD}}$ signal, the only difference from the foregoing residing in the magnitude of the AIR signal.

The output signal produced by inverter 524 is also applied to a circuit generally indicated at 529 that is substantially the same in construction and operation as the circuits described above with reference to FIG. 18. Circuit 529 produces the BSY signal and an inverter 530 responsive thereto produces the $\overline{\text{BSY}}$ signal. The BSY and $\overline{\text{BSY}}$ signals provide status information as to whether the time shared servo is energizing a drive motor.

Figure 23:
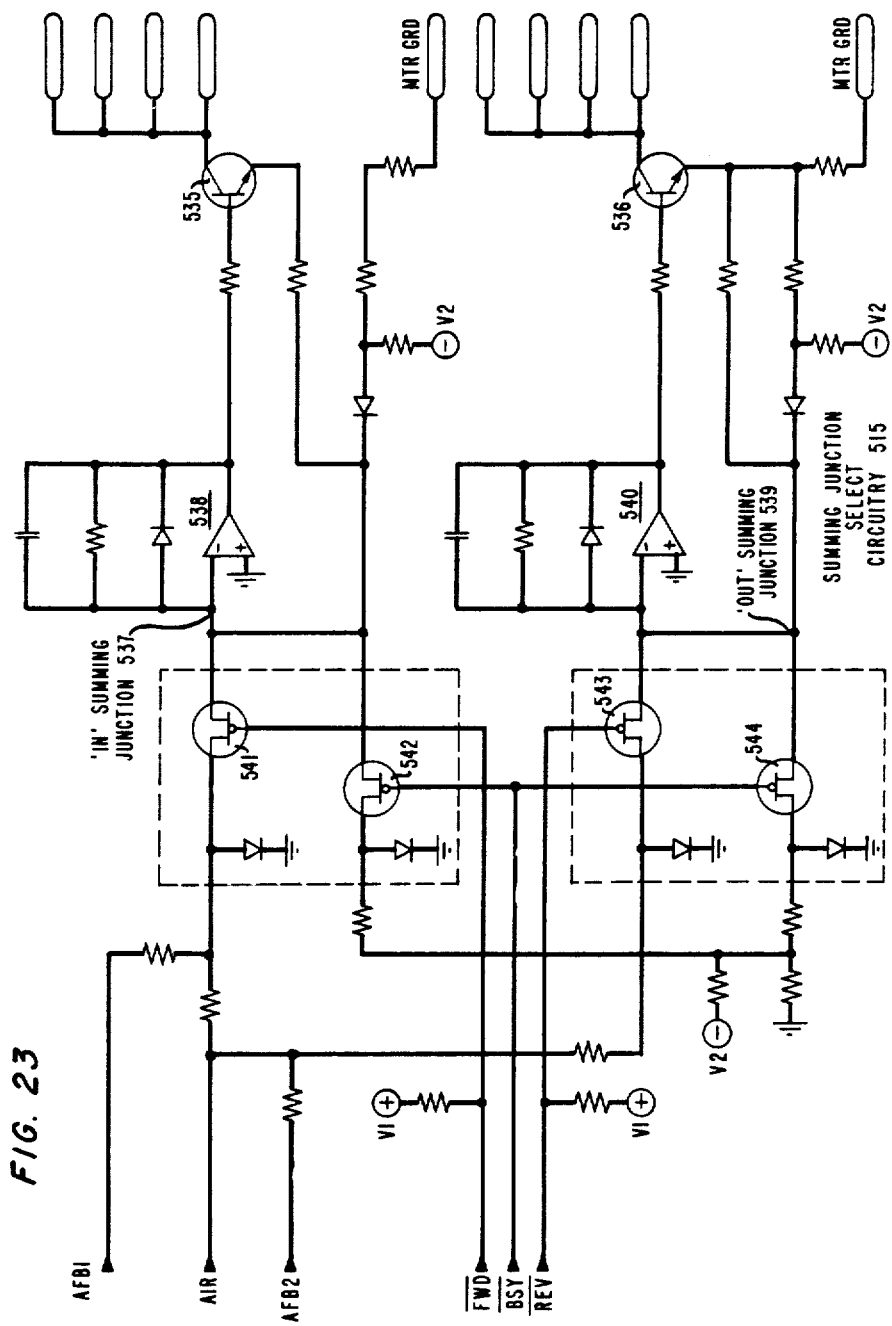

A suitable arrangement of summing junction select circuitry 515 used in the illustrated embodiment is shown in detail in FIG. 23. During a pay-in mode of operation, the time shared servo is used to control the analog velocity of the take-up reel drive motor in the scanned one of the bill caches. At the same time, an open-loop, relatively low-level energization of the supply reel drive motor of the selected bill cache occurs (in the opposite direction so as to maintain web tension. A power transistor 535 cooperates with four of the power transistors shown in FIG. 23 to energize the take-up reel drive motor in the selected bill cache. A power transistor 536 cooperates with the remaining four of the power transistors shown in FIG. 23 to energize the supply reel drive motors in the selected bill cache.

While the existing command is a Forward command, power transistor 535 operates as part of the time shared servo whereas power transistor 536 operates on an open-loop basis. On the hand, while the existing command is either a Reverse or an Unload command, power transistor 536 operates as part of the time shared servo whereas power transistor 535 operates on an open loop basis.

While power transistor 535 operates as part of the time shared servo, the summing junction for the time shared servo is 'In' summing junction 537. Between 'In' summing junction 537 and the base electrode of power transistor 535 there is an amplifier generally indicated at 538. While power transistor 536 operates as part of the time shared servo, the summing junction for the time shared servo is 'Out' summing junction 539. Between 'Out' summing junction 539 and the base electrode of power transistor 536 there is an amplifier generally indicated at 540.

The present invention has been shown and described in conjunction with a microprocessor providing software control for the bill belt mechanism and a part of the prompting display mechanism. Naturally, the bill belt mechanism can be controlled by hardware circuits. At the time of filing of this application, the inventors do not know which of the two modes of practicing the invention are to be preferred. It is the inventor's guess that in volume production of a complete system that "software" control would be employed. Most likely using software specifically created for the project which is different from what is shown in this application although functionally similar. The hardware implementation shown was one created for a potential field trial. Most likely a practical large scale production run would employ functionally similar but structurally different circuit boards.

Accordingly, the inventors recognize that those skilled in the art to which the present invention relates understand that there are many variations possible in the structures shown and described in this application. These structures are shown as illustrations only and not in limitations of the inventive concepts described herein.

Those skilled in the art should recognize that the present invention has a number of functional advantages over prior art devices. It is theft proof to an unusual degree. It is difficult to carry off the premises. The operator cannot be forced to empty the contents. The inventive Terminal will only give change to bills over the amount of the sale. The Terminal will only accept the bill necessary to equal or exceed the amount of the sale. An operator must make decisions about the denomination and genuineness of bills but cannot touch the bills. In food operations this function may eliminate the need for an extra employee. In an operations the inability of the employees to have access to cash is an important anti-theft feature. Both the management and the employees of the firm employing a Terminal incorporating in it the inventive features shown herein gain security, safety and accuracy.

What is claimed is:

1. In a data processing terminal for use as a point of sale device having computing means with an electrical bus for interconnecting electrically and controlling the operation of bill handling means, coin handling means, prompting means for assisting operator behavior the combination comprising: a housing means having a plurality of viewing windows for enabling an operator to visually verify the denomination and genuiness of a bill transported by said bill handling means; said bill handling means having a plurality of input channels; channel indicating members associated with each input channel and under the control of said computing means for indicating which of said input channels has received a bill.

2. In a data processing terminal for use as a point of sale device having computing means with an an electrical bus for interconnecting electrically and controlling the operation of bill handling means, coin handling means, prompting means for assisting operator behavior the combination comprising: a housing means having a viewing window for enabling an operator to visually verify the denomination and genuiness of a bill transported by said bill handling means to said viewing window; said prompting means comprises a display device showing all of the items offered for sale at the terminal organized into at least two categories; a keyboard means having a number of category generating keys for controlling the display of said categories.

3. The device claimed in claim 2 including further a plurality of bill accepting input channels for receiving and dispensing bills; said channels connected to said bill handling means; said bill handling means having a plurality of electrically powered and electronically controlled bill transporting members wherein all of said transporting members can receive bills but less than all of said transporting members can dispense bills.

4. The device claimed in claim 3 wherein at least two bill sensing members are disposed adjacent said bill transporting members; the first of said bill sensing members placed near to said input channel and the second of said bill sensing members placed about one bill length from said input channel along each of said transporting members; said computing means having the means to compute time from when the first bill sensing member detects the presence of a bill; said computing means controlling the operation of said bill transporting members such that said transporting members are activated when a bill is sensed by the first detector member and deactivated by said computing means if no bill is sensed by said second detector member within a predetermined time interval.

5. The device claimed in claim 4 wherein said viewing window has a length and a width greater than of a bill and said viewing window is placed in the top of the housing means.

6. The device claimed in claim 5 wherein said keyboard means has manually operable accept and reject means for accepting or rejecting a bill observed through said viewing window.

7. The device claimed in claim 6 wherein said computing means control said bill transporting members to be operable only one-at-a-time in both the receiving and dispensing directions.

8. The device claimed in claim 2 wherein said keyboard has additional key members for functional control of the terminal and a set of number keys 0 through 9.

9. The device claimed in claim 8 wherein said key members for functional control comprise a plurality of total keys one each for a specified operator; an accept and reject key means; and a plurality of item identifying keys for use in selling the most frequently ordered items.

10. The device claimed in claim 2 wherein the prompting means comprises a strip of graphic material having sale items listed there on a plurality of rotatable support means for holding said strip; a controllable moving means for rotating the support means; a second viewing window in the housing through which the strip is displayed; and said controllable moving means is operative to cause said strip of graphic material to be moved past said second viewing window.

11. The device claimed in claim 2 wherein said prompting means comprises a cathode ray tube member.

12. The device claimed in claim 2 wherein said prompting means comprises an optical display means having a film strip and an illumination means.

13. In a data processing terminal for use as a point of sald device having computer means with an electrical bus for interconnecting the computer means to the bill handling means, coin handling means, wherein said bill and coin handling means operate under the control of said computer means; and a housing means the combination comprising: said bill handling means having at least one electrically powered and electronically controlled bill transporting member and at least one bill accepting input channel; said channel connected to said bill handling means; at least two bill sensing members are disposed adjacent said bill transporting member; the first of said bill sensing members placed near to said input channel and the second of said bill sensing members placed about one bill length from said input channel along said transporting member; said computing means having means to compute the time when the first bill sensing member detects the presence of a bill; said computing means controlling the operation of said bill transporting member such that said transporting member is activated when a bill is sensed by said first detector member and deactivated by said computing means if no bill is sensed by said second detector member within a predetermined time interval.

14. The device claimed in claim 13 wherein said bill handling means has at least two pair of transparent money belt members and a viewing window means; each of said money belts members is supported on a plurality of electrically powered and controlled reel members; said viewing window means has a plurality of viewing stations, one for each pair of transparent money belt members.

15. The device claimed in claim 14 wherein all of said transparent money belt members can receive bills but less than all of said transparent money belt members can dispense bills.

16. The device claimed in claim 15 wherein each of said viewing stations has a physical size greater than the length and width of a bill.

17. The device claimed in claim 16 wherein said computing means controls said bill transporting members for receiving and dispensing bills only one-at-a-time.

18. The device claimed in claim 17 including further a keyboard means having accept and reject key members which are manually operable; said accept and reject key members are operative to control the direction of operation of the bill transporting members.

19. The device claimed in claim 13 including further a third bill sensing member placed near said bill transporting member for generating a signal to be fed to said computing means for causing the computing means to issue a command to stop the actuation of said bill transporting member.

20. In a data processing terminal for use as a point of sale device by an operator for selling merchandise to the public the combination comprising: a cabinet means having front, back, top surface members; a bill slot formed in the front member of the housing; a viewing window formed in the top member of the cabinet, said window having a physical size larger than a bill; keyboard means connected to the housing means, said keyboard means having number keys, function keys, category indicating keys; a computing means contained within the housing; a plurality of transparent bill belt means contained within the housing means for transporting a bill from the bill slot to the viewing window; a plurality of controllable and rotatable unstoring reel means and a controllable and rotatable storing reel means for supporting and controlling the direction of motion of each of the transparent bill belt means; at least three bill detector means associated with each of said transparent bill belt means; the first of said bill detector means disposed adjacent the bill slot; a second bill detector means placed adjacent the transparent bill belt means, about one bill length from the bill slot; the third bill detector means placed along the transparent bill belt means downstream the second detector means and the viewing window; electronic circuit means interconnecting said three bill detector means to said coupling means and to the controllable and rotatable storing and unstoring reel means; said computing means having a memory means to store a set of instructions to control the operation of the terminal; said computing means operative under the set of instructions to bring a tendered bill to the viewing window from one of said bill belt means; manual actuation of a function key controls the acceptance or rejection of a bill; acceptance of a bill causes the bill to remain confined by the transparent bill belt means, rejection of the bill causes the bill to be transported by the bill belt means back to the bill slot.

21. The device claimed in claim 20 wherein said computing means and said set of instructions are operative to calculate the amount of change due and control the bill belt means to dispense the correct change.

22. The device claimed in claim 21 wherein said first bill detector means is operative to sense the presence of the trailing edge of a bill leaving the bill belt means and said first detector means controls the operation of the bill belt means by said detection such that no other bill can be placed within the housing while the presence of the trailing edge of a bill is sensed by the first detecting means.

23. The device claimed in claim 21 wherein said first bill detector means is operative to detect the leading edge of a bill in the bill slot and cause the actuation of the appropriate bill belt means and the inactivity of the remaining bill belt means.

24. The device claimed in claim 21 including further a coin receiving and dispensing means operatively connected to said computing means.

25. The device claimed in claim 24 including further: a prompting display means interconnected to said computing means for showing the operator substantially all of the items for sale at the terminal.

26. The device claimed in claim 25 including further a second viewing window formed in the housing for the operator to observe the prompting display means.

27. The device claimed in claim 26 wherein said category keys are disposed adjacent said second viewing window.

28. The device claimed in claim 24 wherein said prompting display has a strip member with graphic information contained thereon and divided into at least two categories.

29. The device claimed in claim 24 including further: a number of item indicating key members for a part of said keyboard means; a prompting display means under the control of the actuation of said category indicating keys; said prompting display for showing substantially all of the items for sale at the terminal divided into a plurality of categories; the display showing the items individually along with the necessary codes to guide the operator to enter the codes to complete the sale of the items; and, said computing means memory means storing therein the necessary instructions for enabling the terminal to complete the sale of the item indicated by the operator actuating the codes shown by the prompting display.

30. The device claimed in claim 29 including further: at least one sale display means under the control of the computing means for showing the amount of the sale, the amount of money received and the amount of change due.

31. The device claimed in claim 30 including further a printer means for showing the items sold, the amount of money received and the amount of change dispensed.

32. The device claimed in claim 29 including further: communication means for connecting said data processing terminal to another computing device.

33. The device claimed in claim 32 wherein said communication means comprises a telephone auto dialing means and a packet switch network.

34. The device claimed in claim 33 including further a plurality of external condition sensors connected to said computing means.

35. The device claimed in claim 29 including further: a plurality of bearing members contained within the housing; the prompting display means having a strip of material supported on the bearing members; a second viewing window member in the housing means for seeing a portion of the display strip supported by the bearing members; controllable propelling means for moving the strip relative to the bearing members; said controllable propelling means operable by actuating the keyboard means.

36. The device claimed in claim 35 wherein said strip of material has position control indicia thereon; and fourth sensing means are contained within the housing means for detecting said position control indicia.

37. The device claimed in claim 36 including further: connecting means for interconnecting said fourth sensing means to said computer means; the computer means memory having instructions for controlling the operation of the strip of material in response to the indicia sensed by the fourth detecting means.

38. The device claimed in claim 20 wherein said function keys include an accept key and a reject key for each bill belt means.

39. The device claimed in claim 38 wherein said accept key and said reject key are placed adjacent the viewing window.

40. The device claimed in claim 20 wherein said keyboard can actuated to drive the bill belt means in the dispensing direction continuously at high speed until all of the bills stored in said bill belt means are dispensed.

41. In a data processing terminal, a combination for adapting the terminal for use in the course of a point of sale transaction in which no money either tendered by or received by a customer is touched by an operator, the combination comprising: a housing means having a viewing window; and bill handling means within said housing means for transporting each bill tendered by the customer to the viewing window to enable the operator to visually verify the denomination and genuiness of such tendered bill; prompting means for selectively showing all of the items offered for sale organized into a plurality of categories, and keyboard means including a plurality of category selecting keys for controlling the prompting means to show a list of each item in a manually selected category.

* * * * *